United States Patent
Lee et al.

(10) Patent No.: US 11,645,644 B2
(45) Date of Patent: May 9, 2023

(54) MOBILE TERMINAL

(71) Applicant: LG ELECTRONICS INC., Seoul (KR)

(72) Inventors: Sookyeong Lee, Seoul (KR); Jeongyun Heo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 578 days.

(21) Appl. No.: 16/489,677

(22) PCT Filed: Mar. 9, 2017

(86) PCT No.: PCT/KR2017/002600
§ 371 (c)(1),
(2) Date: Aug. 28, 2019

(87) PCT Pub. No.: WO2018/164301
PCT Pub. Date: Sep. 13, 2018

(65) Prior Publication Data
US 2019/0370779 A1    Dec. 5, 2019

(51) Int. Cl.
*G06Q 20/32* (2012.01)
*G06K 7/14* (2006.01)
*G06K 7/10* (2006.01)
*H04W 88/02* (2009.01)

(52) U.S. Cl.
CPC ....... *G06Q 20/3274* (2013.01); *G06K 7/1413* (2013.01); *G06K 7/1417* (2013.01); *G06K 2007/10524* (2013.01); *H04W 88/02* (2013.01)

(58) Field of Classification Search
CPC ..................................................... G06Q 40/00
USPC ..................................................... 705/35, 38
See application file for complete search history.

(56) References Cited

U.S. PATENT DOCUMENTS

| | | | | |
|---|---|---|---|---|
| 6,260,027 | B1* | 7/2001 | Takahashi | G07F 7/0866 705/64 |
| 7,099,850 | B1* | 8/2006 | Mann, II | G06Q 20/367 705/72 |
| 7,689,508 | B2* | 3/2010 | Davis | G06Q 20/3223 455/406 |
| 8,452,654 | B1* | 5/2013 | Wooters | G06Q 30/0234 705/14.34 |
| 8,583,549 | B1* | 11/2013 | Mohsenzadeh | G06Q 30/02 705/38 |
| 8,606,640 | B2* | 12/2013 | Brody | G06Q 20/3229 705/26.1 |

(Continued)

FOREIGN PATENT DOCUMENTS

| | | |
|---|---|---|
| JP | 2006-4037 A | 1/2006 |
| JP | 2014-219775 A | 11/2014 |

(Continued)

*Primary Examiner* — Kirsten S Apple
(74) *Attorney, Agent, or Firm* — Birch, Stewart, Kolasch & Birch, LLP

(57) ABSTRACT

According to the present disclosure, a mobile terminal comprises: a display unit; a sensing unit configured to sense a code scanning situation indicating the situation in which a code scanner scans a code; and a controller configured to control the display unit to automatically display a code for a first payment task when the code scanning situation is sensed and adjust a direction in which the code is displayed according to a direction of light outputted from the code scanner.

19 Claims, 17 Drawing Sheets

(56) References Cited

U.S. PATENT DOCUMENTS

| | | | |
|---|---|---|---|
| 2004/0122685 A1* | 6/2004 | Bunce | G06Q 30/06 705/325 |
| 2005/0250538 A1* | 11/2005 | Narasimhan | G06Q 20/12 455/411 |
| 2006/0208065 A1* | 9/2006 | Mendelovich | G06Q 20/227 705/14.27 |
| 2007/0255564 A1* | 11/2007 | Yee | G10L 17/24 704/E17.016 |
| 2010/0191570 A1* | 7/2010 | Michaud | G06Q 30/02 705/14.27 |
| 2010/0205091 A1* | 8/2010 | Graziano | G06Q 30/02 705/40 |
| 2011/0201306 A1* | 8/2011 | Ali Al-Harbi | G06Q 20/40 705/40 |
| 2012/0271712 A1* | 10/2012 | Katzin | G06Q 20/387 705/14.51 |
| 2013/0030934 A1* | 1/2013 | Bakshi | H04L 63/107 705/18 |
| 2014/0164082 A1* | 6/2014 | Sun | G06Q 30/0214 705/14.16 |
| 2014/0244365 A1* | 8/2014 | Price | G07B 15/02 705/13 |
| 2015/0220924 A1* | 8/2015 | Bakker | G06Q 20/327 705/14.27 |

FOREIGN PATENT DOCUMENTS

| | | |
|---|---|---|
| JP | 2015-22578 A | 2/2015 |
| KR | 10-2012-0044248 A | 5/2012 |
| KR | 10-2016-0099514 A | 8/2016 |

* cited by examiner

MOBILE TERMINAL

CROSS REFERENCE TO RELATED APPLICATIONS

This application is the National Phase of PCT International Application No. PCT/KR2017/002600, filed on Mar. 9, 2017, all of which is hereby expressly incorporated by reference into the present application.

BACKGROUND

The present disclosure relates to a mobile terminal, and more particularly, to automatically providing a code for a payment related task.

Terminals may be generally classified as mobile/portable terminals or stationary terminals according to their mobility. Mobile terminals may also be classified as handheld terminals or vehicle mounted terminals according to whether or not a user may directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal may support more complicated functions such as capturing images or video, reproducing music or video files, playing games, receiving broadcast signals, and the like. By comprehensively and collectively implementing such functions, the mobile terminal may be embodied in the form of a multimedia player or device.

More recently, payment tasks such as payment for goods, collection of loyalty points, discount benefits and the like, may be performed via bar codes or QR codes by using mobile terminals.

However, in the past, the user is having trouble of having to find a code according to execution of an application for a clerk and show the code to the clerk in order to perform the payment task.

In addition, in order to perform a plurality of payment tasks, the user is having trouble of having to recognize the code by exchanging between the clerk and the mobile phone several times.

SUMMARY

Accordingly, an object of the present disclosure is to address the above-noted and other problems.

An objective of the present invention is to provide a mobile terminal capable of automatically displaying a code, if a code scanning situation in which a code scanner intends to scan the code is sensed.

An objective of the present invention is to provide a mobile terminal capable of automatically performing a plurality of payment tasks in order, if a code scanning situation is sensed.

An embodiment of the present invention, a mobile terminal may include a display unit, a sensing unit configured to sense a code scanning situation indicating the situation in which a code scanner scans a code, and a controller configured to control the display unit to automatically display a code for a first payment task when the code scanning situation is sensed and adjust a direction in which the code is displayed according to a direction of light outputted from the code scanner.

Another embodiment of the present invention, a mobile terminal may include a display unit configured to display a code for performing a first payment task, a sensing unit configured to sense a code scanning situation indicating a situation in which a code scanner scans a code, and a control unit configured to control the display unit to display the code by automatically enlarging the code, if the code scanning situation is sensed.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

According to an embodiment of the present invention, the user may perform a payment task quickly without a complicated process.

In addition, according to an embodiment of the present, the user may conveniently perform a plurality of payment tasks at a time.

In addition, according to an embodiment of the present invention, a payment task may be performed as soon as possible by increasing accuracy of code recognition.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element may be connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

However, it should be understood by a person skilled in the art that in the case of excluding a case in which the constitution according to an embodiment described in the present disclosure is applied only to mobile terminals, these teachings may also be applied to stationary terminals such as digital TV, desktop computers, Digital Signage and the like.

Figure 1A:
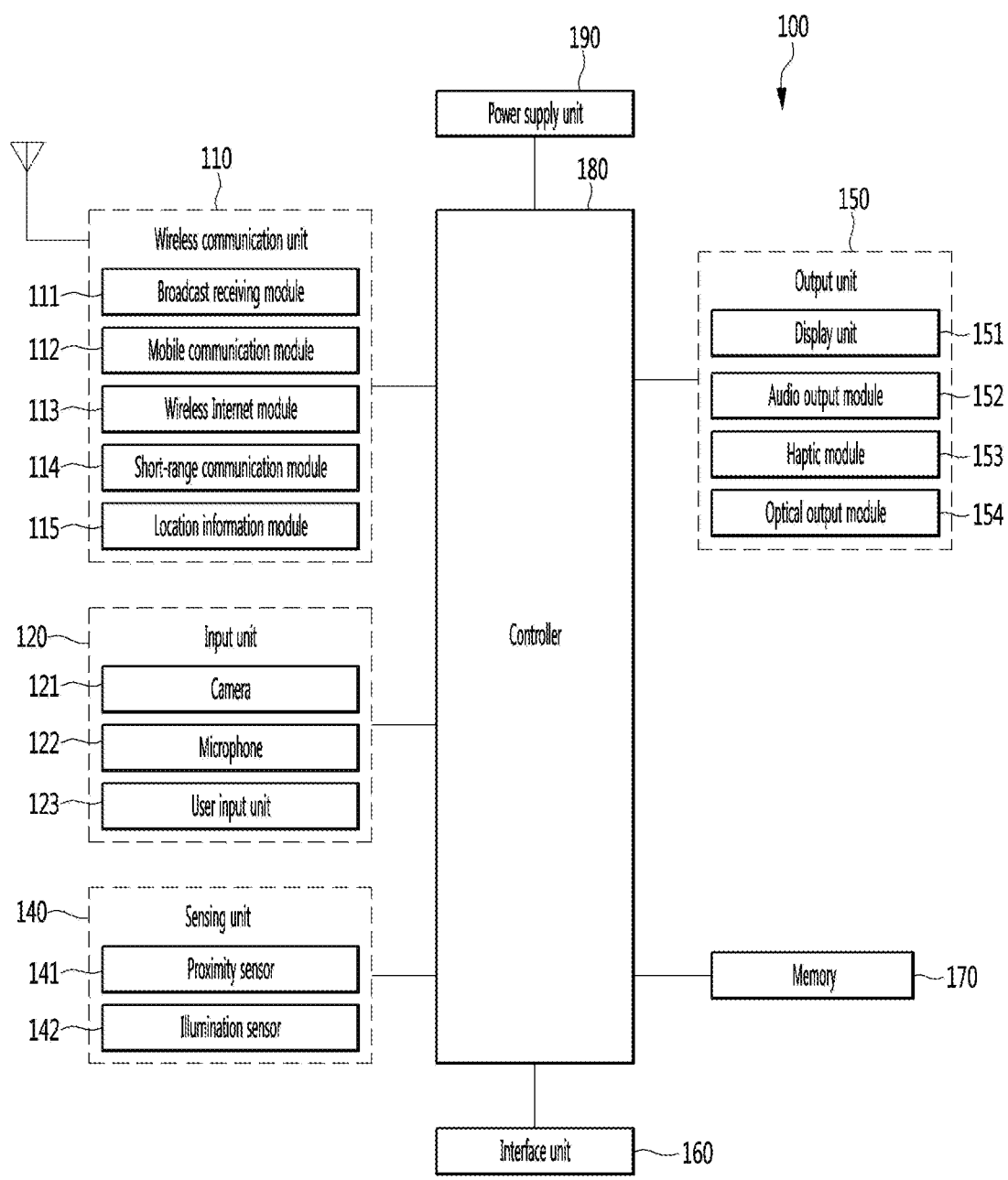
FIG. 1A is a block diagram of a mobile terminal in accordance with the present disclosure.
Figure 1B:
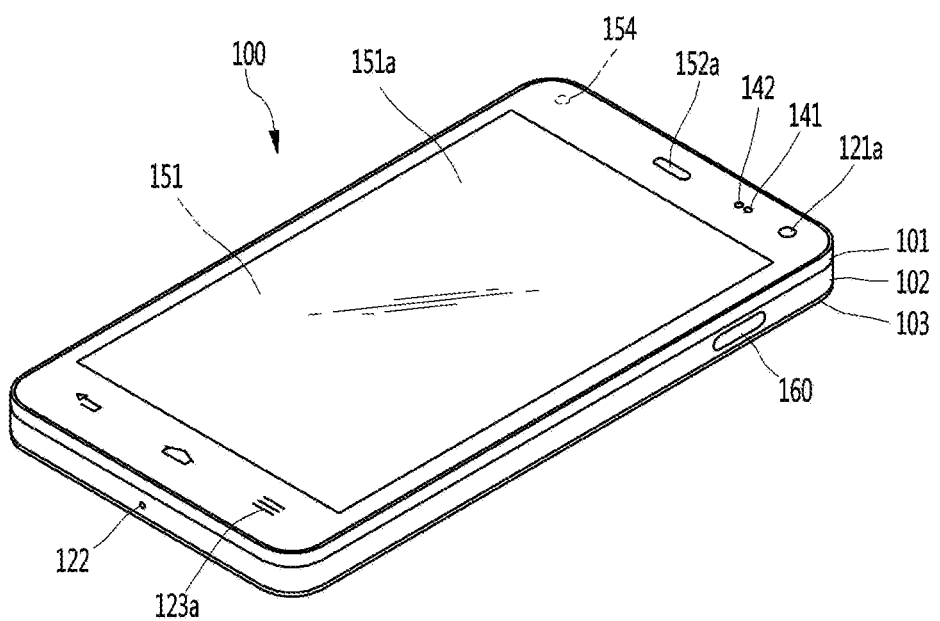
FIGS. 1B and 1C are conceptual views of one example of the mobile terminal, viewed from different directions.
Figure 1C:
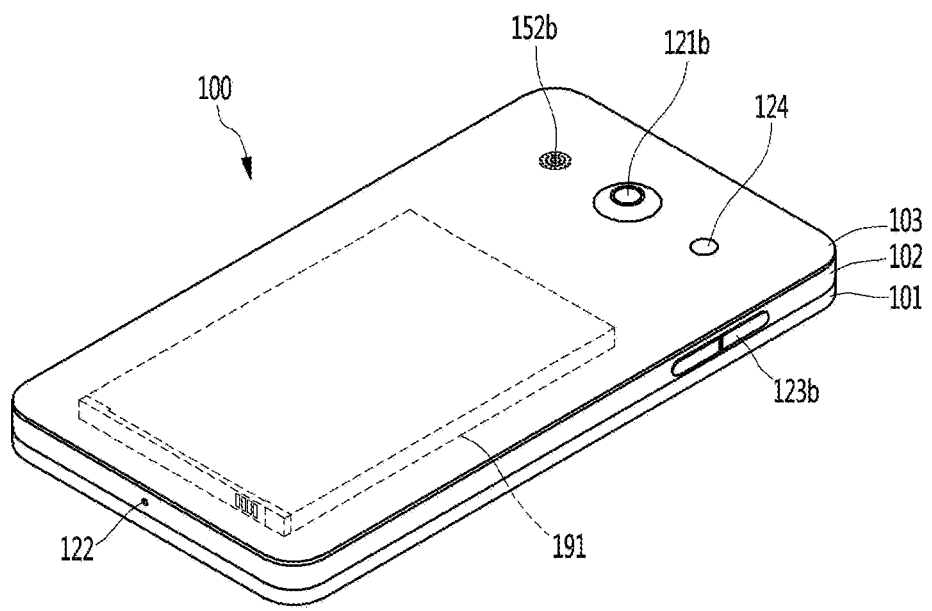

Reference is now made to FIGS. 1A-1C, where FIG. 1A a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190.

It is understood that all of the components illustrated in FIG. 1A is not a requirement in implementing the mobile terminal, and that the mobile terminal described in the present disclosure may have greater or fewer components than those described above.

More specifically, the wireless communication unit 110 among the component includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 for obtaining images or video, a microphone 122, which is one type of audio input device for inputting an audio signal, and a user input unit 123 (for example, a touch key, a push key, a mechanical key, a soft key, and the like) for allowing a user to receive input information. Audio data or image data obtained by the input unit 120 may be analyzed and processed by commands of the user.

The sensing unit 140 may include at least one sensor configured to sense at least one of internal information of the mobile terminal, the surrounding environment information of the mobile terminal, user information, and the like.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone (122), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). Meanwhile, the mobile terminal described in the present disclosure may combine information sensed in at least two sensors among these sensors, and utilize the combinations.

The output unit 150 is typically configured to output various types of information, such as audio, video, tactile output, and the like. The output unit 150 may include at least one of a display unit 151, an audio output module 152, a haptic module 153, and an optical output module 154. The display unit 151 may have an inter-layered structure or an integrated structure with a touch sensor, thereby facilitating a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

In addition, the memory 170 is typically implemented to store data to support various functions or features of the mobile terminal 100. The memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Meanwhile, application programs may be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted above, or activating application programs stored in the memory 170.

In addition, the controller 180 may control at least part of the components illustrated in FIG. 1A in order to execute an application program that have been stored in the memory 170. In addition, the controller 180 may combine at least two of the components included in the mobile terminal 100 together and operate the combination thereof, for execution of the application program.

The power supply unit 190 is configured to receive external power and internal power under control of the processor 180, and provide power to each component included in the mobile terminal 100. The power supply unit 190 may include a battery, and the battery may be configured to be embedded in the terminal body, or configured to be detachable from the terminal body.

Hereinafter, the components listed above will now be described in more detail with reference to FIG. 1A, ahead of describing various embodiments implemented via the mobile terminal 100.

First, regarding the wireless communication unit 110, the broadcast receiving module 111 of the wireless communication unit 110 is typically configured to receive a broadcast signal and/or broadcast associated information from an external broadcast managing entity via a broadcast channel. The broadcast channel may include a satellite channel, a terrestrial channel, or both. Two or more broadcast receiving modules may be provided to the mobile terminal 100 to simultaneously receive at least two broadcast channels, or to support switching among broadcast channels.

The broadcast managing sever may be a server which generates and transmits a broadcast signal and/or broadcast associated information, or a server which receives a pre-generated broadcast signal and/or broadcast associated information, and sends such items to the mobile terminal. The broadcast signal may include a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 may receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network. In this case, the broadcast associated information may be received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 transmits and/or receives wireless signals to and from at least one of a base station, an external terminal and a server in a mobile communication network constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals may include audio call signals, video telephony call signals, or various formats of data according to transmission or reception of text and multimedia messages.

The wireless Internet module 113 may referred to as wireless Internet access, and may be installed inside or outside the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to at least one of wireless Internet technologies in the scope including Internet technologies not listed above.

If the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured for short-range communications, and may support such short-range communications by at least one of technologies such as BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct and Wireless USB (Wireless Universal Serial Bus). The short-range communication module 114 may support wireless communications between the mobile terminal 100 and a wireless communication system, between the mobile terminal 100 and another mobile terminal 100, or between the mobile terminal 100 and a network where another mobile terminal 100 (or an external server) is located, via short-range wireless area networks. The short-range wireless area networks are short-range wireless personal area networks.

Herein, another mobile terminal 100 may be a wearable device (for example, a smart watch, a smart glass or a head mounted display (HMD)), which is able to exchange data with the mobile terminal 100 according to the present disclosure. The short-range communication module 114 may sense (or recognize) the wearable device capable of communicating with the mobile terminal 100, around the mobile terminal 100. In addition, if the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, if a call is received in the mobile terminal 100, the user may answer the call using the wearable device. Also, if a message is received in the mobile terminal 100, the user may check the received message using the wearable device.

The location information module 115 is a module for obtaining a position (or a current position) of the mobile terminal. As an example, the location information module 115 includes a Global Position System (GPS) module, a Wi-Fi module, or both. As one example, if the mobile terminal uses a GPS module, a position of the mobile terminal may be acquired using a signal sent from a GPS satellite.

As another example, if the mobile terminal uses the Wi-Fi module, a position of the mobile terminal may be acquired based on information related to a wireless access point (AP) which transmits or receives a wireless signal to or from the Wi-Fi module. If desired, the location information module 115 may perform any function among other modules of the wireless communication unit 110 in order obtain data associated with the location of the mobile terminal alternatively or additionally. The location information module 115 is a module used to obtain the position (or the current position) of the mobile terminal, and is not limited to a module configured to directly calculate or obtain the position of the mobile terminal.

Next, the input unit 120 is to input image information (or a signal), audio information (or a signal), or information inputted by the user, and for input of the image information, the mobile terminal 100 may include one or a plurality of cameras 121. The cameras 121 processes image frames of still pictures or video obtained by image sensors in a video or image capture mode. The processed image frames may be displayed on the display unit 151 or stored in the memory 170. In some cases, a plurality of cameras 121 included in the mobile terminal 100 may be arranged in a matrix configuration, and the cameras 121 having such matrix configuration permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal to an electrical voice data. The processed voice data may be utilized in various manners according to a function (or an application program) being executed in the mobile terminal 100. Meanwhile, the microphone 122 may include assorted noise removing algorithms to remove noise generated in the course of receiving the external audio.

The user input unit 123 is to input information by a user, and if the information is inputted through the user input unit 123, the controller 180 may control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may consist of a virtual key, a soft key or a visual key which is displayed on a touch screen through software processing, or consist of a touch key which is located at a location that is other than the touch screen. On the other hand, the virtual key or the visual key may be displayed on the touch screen in various shapes, for example, graphic, text, icon, video, or a combination thereof.

Meanwhile, the sensing unit 140 is generally configured to sense at least one of internal information of the mobile terminal, surrounding environment information of the mobile terminal, user information, or the like, and to create a sensing signal corresponding thereto. Based on the sensing signal, the controller 180 may control a drive or operation of the mobile terminal 100 or may execute data processing, a function or an operation associated with an application program installed in the mobile terminal 100. The sensing unit 140 may include a variety of sensors, and representative ones among the sensors will now be described in more detail.

First, the proximity sensor 141 may be referred to as a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. If the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

Meanwhile, the term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

Meanwhile, controller 180 may process data corresponding to proximity touches and proximity touch patterns sensed by the proximity sensor 141, and may cause output of visual information on the touch screen. In addition, the controller 180 may control the mobile terminal 100 to execute different operations or process different data according to whether a touch with respect to a point on the touch screen is either a proximity touch or a contact touch.

A touch sensor may sense a touch (or the touch input) applied to the touch screen (or the display unit 151), using any of a variety of touch methods, such as a resistive type, a capacitive type, an infrared type, and a magnetic field type, among others.

As one example, the touch sensor may be configured to convert changes of pressure applied to a specific part of the touch screen, or convert capacitance occurring at a specific part of the touch screen, into electric input signals. The touch sensor may be configured to allow a touch object applying a touch input on the touch screen to sense a touched position, a touched area, touch pressure, touch capacitance, and the like, on the touch sensor. Herein, a touch object is generally used to apply a touch input to the touch sensor. Examples of typical touch objects include a finger, a touch pen, a stylus pen, a pointer, or the like.

If the touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, and be the controller 180.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program.

Meanwhile, the touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

Position information relating to a touch object may be recognized using an ultrasonic sensor. Meanwhile, the controller 180 may calculate a position of a wave generation source based on information sensed by an optical sensor and a plurality of ultrasonic sensors. The position of the wave generation source may be calculated by using light much faster than ultrasonic waves, that is, the time for which the light reaches the optical sensor is much shorter than the time for which the ultrasonic wave reaches the ultrasonic sensor. More specifically, the position of the wave generation source may be calculated using the time difference from the time that the ultrasonic wave reaches the sensor based on the light as a reference signal.

Meanwhile, as a component of the input unit 120, the camera 121 includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to display (output) information processed in the mobile terminal 100. For example, the display unit 151 may display execution screen information of an application program executing at the mobile terminal 100 or user interface (UI) and graphic user interface (GUI) information in response to the execution screen information.

In addition, the display unit 151 may be implemented as a stereoscopic display unit configured to display stereoscopic images. A typical stereoscopic display unit may employ a 3D display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method may be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors to its front surface or its back surface. The signal output may be terminated as the mobile terminal senses that a user has checked the event.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

Meanwhile, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

In addition, if the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal 100 is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

Meanwhile, as described above, the controller 180 may typically control the general operations of the mobile terminal 100. For example, the controller 180 may set or release a lock state for restricting a user from inputting a control command with respect to applications if a status of the mobile terminal meets a preset condition.

In addition, the controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the mobile terminal 100 according to the present disclosure.

The power supply unit 190 receives external power or provides internal power and supplies the appropriate power required for operating respective elements and components under control of the controller 180. The power supply unit 190 may include a battery, and the battery may be an embedded battery which is typically rechargeable and may be detachably coupled to the terminal body for charging, and the like.

In addition, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Meanwhile, various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Herein, as the mobile terminal 100 is regarded as at least one assembly, the terminal body may be understood as a concept to indicate this assembly.

The mobile terminal 100 will generally include a case (for example, frame, housing, cover, and the like) forming the appearance of the terminal. As illustrated, the mobile terminal 100 may include a front case 101 and a rear case 102. Various electronic components are arranged within in a space formed by a combination of the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components mounted in the rear case 102 include a detachable battery, an identification module, a memory card, and the like. In this case, a rear cover 103 is shown covering the electronic components, and this cover may be detachably coupled to the rear case 102. Therefore, if the rear cover 103 is detached from the rear case 102, the electronic components mounted to the rear case 102 are externally exposed.

As illustrated, if the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating various components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space if those cases are coupled.

The mobile terminal 100 includes a display unit 151, first and second audio output modules 151*a*/151*b*, a proximity sensor 141, an illumination sensor 142, an optical output module 154, first and second cameras 121*a*/121*b*, first and second manipulation units 123*a*/123*b*, a microphone 122, interface unit 160 and the like.

Hereinafter, it will be described for the mobile terminal as shown in FIGS. 1B and 1C. The display unit 151, the first audio output module 152*a*, the proximity sensor 141, an illumination sensor 142, the optical output module 154, the first camera 121*a* and the first manipulation unit 123*a* are arranged in front surface of the terminal body, the second manipulation unit 123*b*, the microphone 122 and interface unit 160 are arranged in side surface of the terminal body, and the second audio output modules 152*b* and the second camera 121*b* are arranged in rear surface of the terminal body.

However, these components are not limited to such arraignments, and these components may be excluded or replaced, or may be arranged in other sides. For example, the first manipulation unit 123*a* may not arranged on another surface of the terminal body, and the second audio output module 152*b* may be located on the side surface of the terminal body, not the rear surface of the terminal body.

The display unit 151 displays (outputs) information processed in the mobile terminal 100. For example, the display unit 151 may display execution screen information of the application program driven in the mobile terminal 100, or information of UI (User Interface) and GUI (Graphic User Interface) according to such execution screen information.

The display unit 151 include at least one of a liquid crystal display (LCD), a thin film transistor-liquid crystal display (TFT-LCD), an organic light emitting diode (OLED), a flexible display, a 3-dimensional (3D) display, an e-ink display, and combinations thereof.

In addition, two or more display units 151 may be present according to an implementing shape of the mobile terminal 100. In this case, in the mobile terminal 100, a plurality of the display units may be arranged on one side, either spaced apart from each other, or these devices may be integrated, or these devices may be arranged on different surfaces.

The display unit 151 may include a touch sensor which senses a touch input for the display unit 151 such that a control command may be input by a touch manner. If the touch input is performed for the display unit 151 by using this case, the touch sensor may be configured to sense this touch and the controller 180 may be configured to generate the control command corresponding to the touch based on this case. The content which is input in the touching manner may be a text or numerical value, or a menu item which may be indicated or designated in various modes.

Meanwhile, the touch sensor may be configured in a form of a film having a touch pattern, disposed between the window 151a and a display (not shown) on a rear surface of the window 151a, or may be a metal wire which is patterned directly on the rear surface of the window 151a. Alternatively, the touch sensor may be integrally formed with the display. For example, the touch sensor may be disposed on a substrate of the display or within the display.

As described above, the display unit 151 may form a touch screen together with the touch sensor. In this case, the touch screen may serve as the user input unit 123 (see FIG. 1A). Therefore, the touch screen may replace at least some of the functions of the first manipulation unit 123a.

The first audio output module 152a may be implemented in the form of a receiver to allow a call sound to be transmitted ears of the user, and the second sound output module 152b may be implemented in the form of a loud speaker to output various alarm sounds or reproduction sounds of multimedia.

The window 151a of the display unit 151 may form an audio hole for releasing sounds generated by the first audio output module 152a. However, the present disclosure is not limited thereto, and the sound may be implemented to be released along an assembly gap between the structural bodies (for example, a gap between the window 151a and the front case 101). In this case, the hole independently formed to output audio sounds may not be seen or is otherwise hidden in terms of appearance, thereby further simplifying the appearance of the mobile terminal 100.

The optical output module 154 may be configured to output light for indicating an event generation. Examples of such events include a message reception, a call signal reception, a missed call, an alarm, a schedule notice, an email reception, information reception through an application, and the like. If the controller 180 senses that the user has checked an event, the controller 180 may control the optical output unit 154 to stop the light output.

The first camera 121a may process image frames such as still or moving images obtained by the image sensor in a capture mode or a video call mode. The processed image frames may be displayed on the display unit 151 and may be stored in the memory 170.

The first and second manipulation units 123a and 123b are examples of the user input unit 123 manipulated to receive a command for controlling an operation of the mobile terminal 100. The first and second manipulation units 123a and 123b may be commonly referred to as a manipulating portion, and may also employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

The figure illustrates the first manipulation unit 123a as a touch key, but the present disclosure is not limited thereto. For example, the first manipulation unit 123a may include a mechanical key, or a combination of a touch key and a push key.

Input received at the first and second manipulation units 123a and 123b may be set in various ways. For example, the first manipulation unit 123a may receive commands such as a menu, home key, cancel, search, or the like, and the second manipulation unit 123b may receive commands such as control of a volume level being output from the first or second audio output modules 152a or 152b, a switch to a touch recognition mode of the display unit 151, or the like.

Meanwhile, as another example of the user input unit 123, a rear input unit (not shown) may be located on the rear surface of the terminal body. The rear input unit may be manipulated to receive a command for controlling an operation of the mobile terminal 100. The input may be used in a variety of different ways. For example, the rear input unit may receive commands such as power on/off, start, end, scroll, control volume level being output from the first or second audio output modules 152a or 152b, switch to a touch recognition mode of the display unit 151, and the like. The rear input unit may be configured in a form capable of touch input, a push input, or combinations thereof.

The rear input unit may be located to overlap the display unit 151 of the front side in a thickness direction of the terminal body. As one example, if the user grabs the terminal body with one hand, the rear input unit may be located on an upper end portion of the rear side of the terminal body such that a user may easily manipulate it using a forefinger. The present disclosure is not limited thereto, and the position of the rear input unit may be changed.

As such, if the rear input unit is included in the rear side of the terminal body, a new form of user interface may be implemented using this case. In addition, as described above, if the touch screen or the rear input unit replaces at least part of the functionality of the first manipulation unit 123a installed on the front side of the terminal body, and then, if the first manipulation unit 123a is omitted from the front side of the terminal body, the display unit 151 may have a larger screen.

Meanwhile, the mobile terminal 100 may include a finger scan sensor which scans a user's fingerprint. The controller 180 may then use fingerprint information sensed by the finger scan sensor as part of an authentication procedure. The finger scan sensor may be installed in the display unit 151 or the user input unit 123.

The microphone 122 is configured to receive the voice of the user, other sounds, and the like. The microphone 122 is included in a plurality of positions, and may be implemented to receive stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121*a*.

The second camera 121*b* may include a plurality of lenses arranged along at least one line. The plurality of lenses may also be arranged in a matrix configuration. The cameras may be referred to as an "array camera." If the second camera 121*b* is implemented as an array camera, images may be captured in various manners using the plurality of lenses and images with better qualities.

A flash 124 may be arranged adjacent to the second camera 121*b*. If an image of a subject is captured with the camera 121*b*, the flash 124 illuminates the subject.

The second audio output module 152*b* may be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, the antenna may be formed in a film type and be attached to an inner surface of the rear cover 103, and a case that includes a conductive material may be configured to function as the antenna.

The terminal body includes a power supply unit 190 (see FIG. 1A) for supplying power to the mobile terminal 100. The power supply unit 190 may include a battery 191 which is mounted in the terminal body or detachably coupled to an outside of the terminal body.

The battery 191 may receive power via a power source cable connected to the interface unit 160. Also, the battery 191 may be recharged in a wireless manner via a wireless charger. Wireless charging may be implemented by magnetic induction or resonance (electromagnetic resonance).

Meanwhile, the rear cover 103 is shown coupled to the rear case 102 for shielding the battery 191, to prevent separation of the battery 191, and to protect the battery 191 from an external impact or from foreign material. If the battery 191 is detachable from the terminal body, the rear case 103 may be detachably coupled to the rear case 102.

An accessory for protecting an appearance or assisting or extending the functions of the mobile terminal 100 may be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the present disclosure may display information processed in the mobile terminal by using flexible display, which will hereinafter be described in more detail based on the accompanying drawings.

Figure 2:
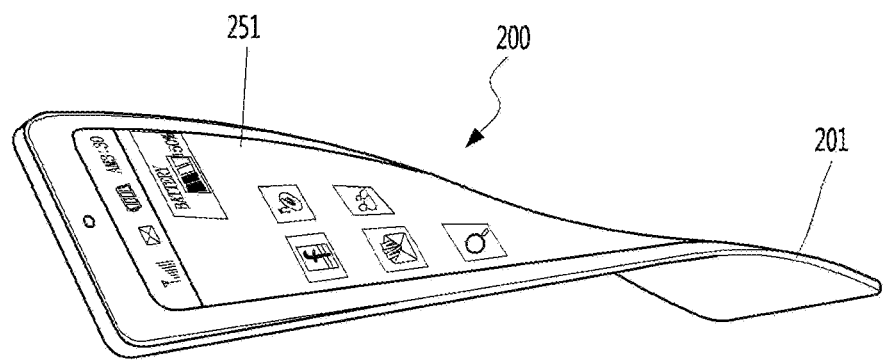
FIG. 2 is a conceptual view of a deformable mobile terminal according to an alternative embodiment of the present disclosure.

FIG. 2 is a conceptual view of a deformable mobile terminal 200 according to an alternative embodiment of the present disclosure.

In this figure, a display unit 251 may be configured to be deformable by an external force. This deformation may include at least one of curving, bending, folding, twisting, rolling, and combinations thereof. The deformable display unit 251 may also be referred to as a "flexible display unit." Herein, the flexible display unit 251 may include a general flexible display, electronic paper (also known as e-paper), and combinations thereof. In general, a mobile terminal 200 may be configured to include features that are the same or similar to that of mobile terminal 100 of FIGS. 1A to 1C.

The flexible display is generally formed as a lightweight, non-fragile display, which still exhibits characteristics of a conventional flat panel display, but is instead fabricated on a thin and flexible substrate capable of curving, bending, folding, twisting or rolling like paper.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

If in a state that the flexible display unit 251 is not deformed (for example, in a state with an infinite radius of curvature and referred to as a first state), a display region of the flexible display unit 251 includes a generally flat surface. If in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

The first state of the flexible display unit 251 may be a curved state (for example, a state of being curved from up to down or from right to left), instead of being in flat state. In this embodiment, if an external force is applied to the flexible display unit 251, the flexible display unit 251 may transition to the second state such that the flexible display unit is deformed into the flat state (or a less curved state) or into a more curved state.

Meanwhile, the flexible display unit 251 may implement a flexible touch screen using a touch sensor in combination with the display. If a touch is received at the flexible touch screen, the controller 180 (see FIG. 1A) may execute certain control corresponding to the touch input. The flexible touch screen may be configured to sense a touch input in both the first and second states.

Meanwhile, according to an embodiment of a deformation of the present disclosure, the mobile terminal 200 may include may include a deformation sensor which senses the deforming of the flexible display unit 251. The deformation sensor may be included in the sensing unit 140 (see FIG. 1A).

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities may include any type of information which may be sensed in response to the curving of the flexible display unit 251.

In addition, the controller 180 may change information displayed on the flexible display unit 251, or generate a control signal for controlling a function of the mobile terminal 200, based on the information related to the deforming of the flexible display unit 251 sensed by the deformation sensor.

Meanwhile, according to an embodiment of a deformation of the present disclosure, the mobile terminal 200 may include a case 201 for accommodating the flexible display unit 251. The case 201 may be deformable together with the flexible display unit 251 by the external force, taking into account the characteristics of the flexible display unit 251.

In addition, a battery (not shown in this figure) located in the mobile terminal 200 may also be deformable in cooperation with the flexible display unit 251 by an external force, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 may be deformed into the second state from the first state by a user command, application command, or the like.

Meanwhile, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like. Hereinafter, examples of the mobile terminals extended to wearable devices will be described.

The wearable device may exchange data with (or cooperate with) another mobile terminal 100. The short-range communication module 114 may sense (or recognize) a wearable device that is near-enough to communicate with the mobile terminal. In addition, if the sensed wearable device is a device which is authenticated to communicate with the mobile terminal 100, the controller 180 may transmit data processed in the mobile terminal 100 to the wearable device via the short-range communication module 114, for example. Hence, a user may use the data processed in the mobile terminal 100 on the wearable device. For example, if a call is received in the mobile terminal 100, the user may answer the call using the wearable device. Also, if a message is received in the mobile terminal 100, the user may check the received message using the wearable device.

Figure 3:
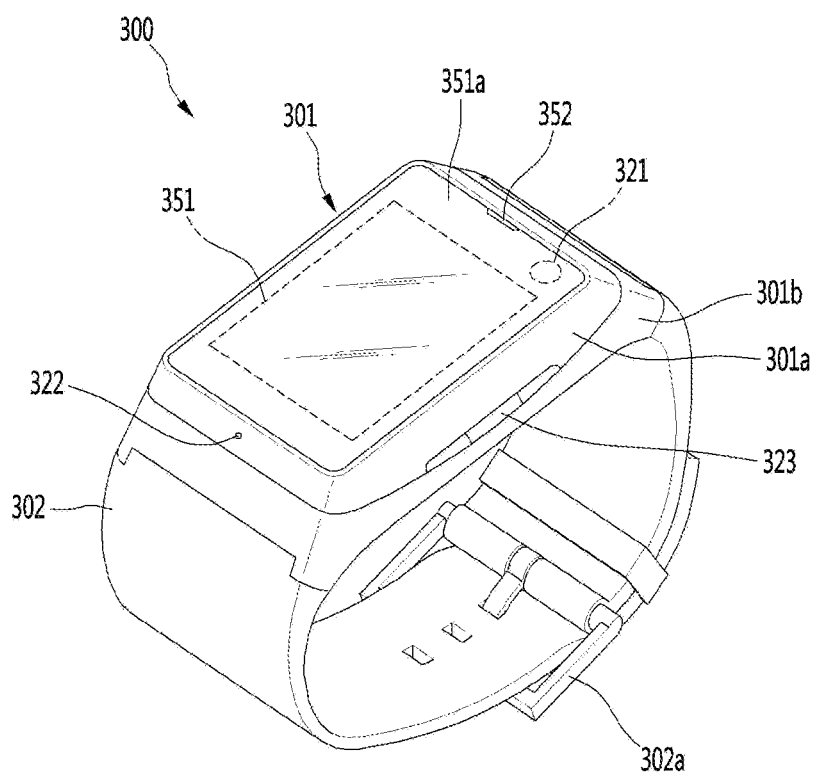
FIG. 3 is a conceptual view of a watch-type mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, the mobile terminal 300 may be configured to include features that are the same or similar to that of mobile terminal 100 of FIGS. 1a to 1c.

The main body 301 may include a case having a certain appearance. As illustrated, the case may include a first case 301a and a second case 301b cooperatively defining an inner space for accommodating various electronic components. The present invention is not limited thereto, and a single case may alternatively be implemented, with such a case being configured in the inner space, thereby implementing a mobile terminal 300 with a uni-body.

The watch-type mobile terminal 300 may perform wireless communication, and an antenna for the wireless communication may be installed in the main body 301. The antenna may extend its function using the case. For example, a case including a conductive material may be electrically connected to the antenna to extend a ground area or a radiation area.

The display unit 351 is shown located at the front side of the main body 301 to output information. The display unit 351 includes a touch sensor so that the display unit may function as a touch screen. As illustrated, a window 351a of the display unit 351 is positioned on the first case 301a to form a front surface of the terminal body together with the first case 301a.

The main body 301 may include an audio output module 352, a camera 321, a microphone 322, a user input unit 323 and the like. If the display unit 351 is implemented as a touch screen, the display unit 351 may function as the user input unit 323. Thus, a separate key may not be included in the main body 301.

The band 302 is commonly worn on the user's wrist and may be made of a flexible material for facilitating wearing of the device. As one example, the band 302 may be made of fur, rubber, silicon, synthetic resin, or the like. In addition, the band 302 may also be configured to be detachable from the main body 301. Accordingly, the band 302 may be replaceable with various types of bands according to a user's preference.

Meanwhile, the band 302 may be used for extending the performance of the antenna. For example, the band may include a ground extending portion (not shown) electrically connected to the antenna to extend a ground area.

The band 302 may include a fastener 302a. The fastener 302a may be implemented into a buckle type, a snap-fit hook structure, a Velcro® type, or the like, and may include a flexible section or material. This figure illustrates an example that the fastener 302a is implemented in a form of the buckle.

Figure 4:
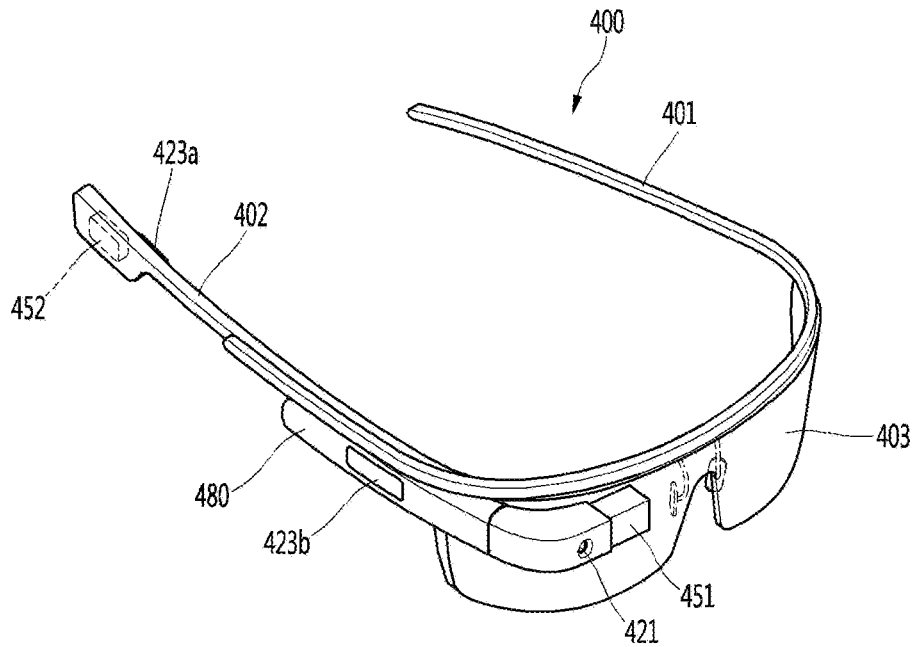
FIG. 4 is a conceptual view of a glasses-type mobile terminal according to another alternative embodiment of the present disclosure.

FIG. 4 is a perspective view illustrating one example of a glass-type mobile terminal 400 according to another exemplary embodiment.

The glass-type mobile terminal 400 may be wearable on a head of a human body and provided with a frame (case, housing, etc.) therefor. The frame may be made of a flexible material to be easily worn. The frame is shown having a first frame 401 and a second frame 402. In general, the mobile terminal 400 may be configured to include features that are the same or similar to that of mobile terminal 100 of FIGS. 1a-1c.

The frame may be supported on the head and defines a space for mounting various components. As illustrated, electronic components, such as a control module 480, an audio output module 452, and the like, may be mounted to the frame. Also, a lens 403 for covering either or both of the left and right eyes may be detachably coupled to the frame.

The control module 480 controls various electronic components disposed in the mobile terminal 400. The control module 480 may be understood as a component corresponding to the aforementioned controller 180. This figure illustrates that the control module 480 is installed in the frame on one side of the head. However, the positions of the control module 480 are not limited thereto.

The display unit 451 may be implemented as a head mounted display (HMD). The HMD refers to display techniques by which a display is mounted to a head to show an image directly in front of a user's eyes. In order to provide an image directly in front of the user's eyes if the user wears the glass-type mobile terminal 400, the display unit 451 may be located to correspond to either or both of the left and right eyes. This figure illustrates that the display unit 451 is located on a portion corresponding to the right eye to output an image viewable by the user's right eye.

The display unit 451 may project an image into the user's eye using a prism. Also, the prism may be formed from optically transparent material such that the user may view both the projected image and a general visual field (a range that the user views through the eyes) in front of the user.

In such a manner, the image output through the display unit 451 may be viewed while overlapping with the general visual field. The mobile terminal 400 may provide an augmented reality (AR) which overlay realistic images or virtual images on a background to show the images in the form of one image, using the characteristic of the display.

The camera 421 is located adjacent to at least one of the left and right eyes to capture a front image. Since the camera 421 is located adjacent to the eye, the camera 421 may acquire a scene that the user is currently viewing.

This figure illustrates that the camera 421 included in a control module 480, but the present disclosure is not limited thereto. The camera 421 may be installed in the frame part, and a plurality of cameras may be included and used to acquire a stereoscopic image.

The glass-type mobile terminal 400 may include user input units 423a and 423b, which may each be manipulated by the user to provide an input. The user input units 423a and 423b may employ techniques which permit input via a tactile input. Typical tactile inputs include a touch, push, or the like. In this figure, the user input units 423a and 423b are shown operable in a pushing manner and a touching manner in the frame and the control module 480, respectively.

Further, the glass-type mobile terminal 400 may include a microphone (not shown) which receives and processes sound into electric audio data, and an audio output module 452 for outputting an audio. The audio output module 452 may be configured to produce audio in a general audio output manner or an osteoconductive manner. If the audio output module 452 is implemented in the osteoconductive manner, the audio output module 452 may be closely adhered to the head if the user wears the mobile terminal 400, and vibrate the user's skull to transfer sounds.

Next, according to the present disclosure, a communication system which is operable via the mobile terminal 100 will now be described.

First, such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (particularly including, Long Term Evolution (LTE), LTE-A (Long Term Evolution-Advanced)), Global System for Mobile Communications (GSM), and the like.

Hereinafter, for the convenience of explanation, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to be connected with a conventional Public Switched Telephone Network (PSTN) and the BSCs. The BSCs are coupled to the base stations via backhaul lines. The backhaul lines may be configured in accordance with at least one of E1/T1, ATM, IP, PPP, Frame Relay, HDSL, ADSL, or xDSL. Hence, the plurality of BSCs may be included in the CDMA wireless communication system.

A plurality of base stations may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. Also, the base stations may also be denoted as "cell sites." In addition, each of a plurality of sectors for a given base station may be referred to as a plurality of cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

In addition, Global Positioning System (GPS) satellites for locating the position of the mobile terminal 100 may cooperate with the CDMA wireless communication system. The satellite helps to recognize the position of the mobile terminal 100. Useful position information may be obtained with greater or fewer satellites than two satellites. Herein, the position of the mobile terminal 100 may be tracked by using all technologies capable of tracking positions as well as a GPS tracking technology. In addition, at least one of the GPS satellites may alternatively or additionally be configured to provide satellite DMB transmissions.

The location information module 115 is generally configured to detect, calculate, or identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 may measure an accurate time and distance from three or more satellites, and accurately calculate a current location of the mobile terminal according to trigonometry based on the measured time and distances. Currently, a method of acquiring distance and time information from three satellites and performing error correction with another satellite may be used. In addition, the GPS module 115 may calculate speed information in real time to calculate a current position. Sometimes, it is difficult to measure the accurate position of the mobile terminal by using the GPS module in a blind spot of satellite signals, such as an indoor space. Hence, in order to compensate for the determination of the GPS manner, Wi-Fi Positioning System (WPS) may be utilized.

The Wi-Fi positioning system (WPS) refers to a location determination technology based on a wireless local area network (WLAN) using Wi-Fi, as a technology for tracking the location of the mobile terminal 100, by using a Wi-Fi module included in the mobile terminal 100 and a wireless AP (wireless Access Point) for transmitting or receiving a wireless signal to/from the Wi-Fi module.

The Wi-Fi positioning system may include a Wi-Fi location determination server, a mobile terminal 100, a wireless access point (AP) connected to the mobile terminal 100, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP connected to the mobile terminal 100 may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include at least one of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. At this time, the information of any wireless APs stored in the database may be information such as MAC address, SSID, channel information, privacy network type, latitude and longitude coordinates of the wireless AP, building at which the wireless AP is located, floor number, detailed indoor location information (GPS coordinate available), AP owner's address, phone number, and the like. At this time, in order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. The location information of the mobile terminal 100 is extracted (analyzed) by comparing the included information and the received wireless AP information.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal. The Cell-ID method is an implementation that is minimally complex, does not require additional costs, and location information may be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, the characteristics of radio waves need to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 may acquire location information by being connected to at least one wireless AP. At this time, the number of wireless APs required to acquire location information of the mobile terminal 100 may be variously changed according to a wireless communication environment in which the mobile terminal 100 is positioned.

As previously described with regard to FIG. 1A, the mobile terminal may be subjected to short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

Among them, a NFC module provided at the mobile terminal supports short-range wireless communication between terminals within a distance of about 10 cm, which is a non-contactable type. The NFC module may operate in one of a card mode, a reader mode, or a P2P mode. The mobile terminal 100 may further include a security module for storing card information, in order to operate the NFC module in a card mode. Herein, the security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal may read data from an external tag. At this time, the data received from the external tag by the mobile terminal may be coded into the NFC Data Exchange Format defined by the NFC Forum. In addition, the NFC Forum generally defines four record types. More specifically, the NFC Forum defines four Record Type Definitions (RTDs) such as smart poster, text, Uniform Resource Identifier (URI), and general control. If the data received from the tag is a smart poster type, the controller may execute a browser (e.g., Internet browser). If the data received from the tag is a text type, the controller may execute a text viewer. If the data received from the tag is a URI type, the controller may execute a browser or originate a call. If the data received from the tag is a general control type, the controller may execute a proper operation according to control content.

In some cases in which the NFC module operates in a P2P (Peer-to-Peer) mode, the mobile terminal may execute P2P communication with another mobile terminal. At this time, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. Sometimes, the P2P mode may be effectively utilized in switching data of a small capacity, because an available distance for NFC communication is short.

Hereinafter, preferred embodiments related to a controlling method which may be implemented in the mobile terminal configured above will be described in more detail with reference to the accompanying figures. It is understood by those skilled in the art that the present features may be embodied in different specific forms without departing from the spirit and the essential characteristic of the present disclosure.

Figure 5:
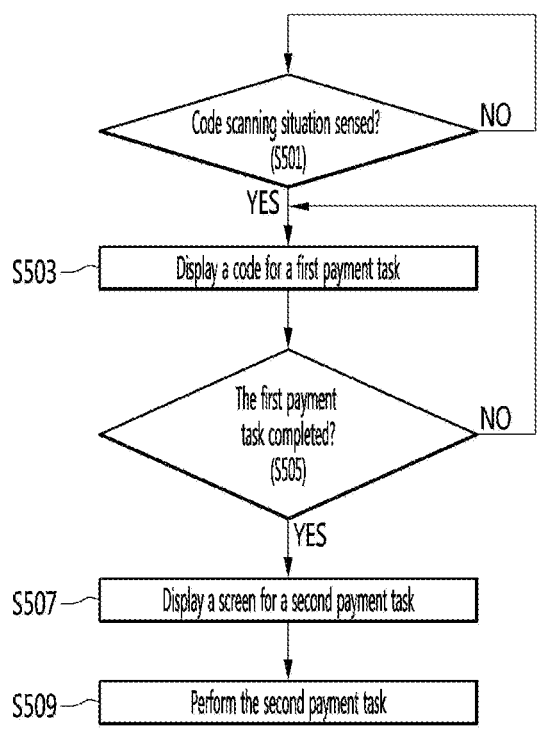
FIG. 5 is a diagram illustrating an operating method of a mobile terminal according to an embodiment of the present disclosure.

FIG. 5 is a diagram illustrating an operating method of a mobile terminal according to an embodiment of the present disclosure.

Referring to FIG. 5, the control unit 180 of the mobile terminal 100 determines that a code scanning situation is sensed (S501).

The code scanning situation may be a situation for scanning a code stored in the mobile terminal 100, via a code scanner.

The code scanner may be a device for scanning a code in order to receive code information corresponding to the code. The code scanner may perform tasks for payment, saving and a discount for goods by using the code information.

The code information may include at least one of payment information for payment, saving information for goods saving, and discount information for a discount.

The control unit 180 may determine that the code scanning situation is sensed, if information for light outputted from the code scanner matches information for predetermined light.

The information for the predetermined light may include at least one of predetermined intensity of the light, a predetermined shape of the light and a predetermined color of the light.

The memory 170 may store information for the predetermined light.

In an embodiment, the controller 180 may sense the code scanning situation by using at least one of a front camera 121a and an illumination sensor 142.

The controller 180 may determine that the code scanning situation is sensed, via the front camera 121a, if a shape of the light outputted from the code scanner is a predetermined shape of the light.

The controller 180 may determine that the code scanning situation is sensed, if intensity of light measured via the illumination sensor 142 is equal to or more than the predetermined intensity.

The controller 180 may determine that the code scanning situation is sensed, if a shape of light received via the front camera 121a is consistent with the predetermined shape of light, and the intensity of the light measured via the illumination sensor 142 is equal to or more than the predetermined intensity.

Meanwhile, the controller 180 may turn on at least one of the front camera 121a and the illumination sensor 142, if the code scanner moves closer to the mobile terminal 100. To that end, a code scanning situation may be sensed.

In another embodiment, the controller 180 may sense the code scanning situation, by using an optical sensor embedded in the display unit 151. The optical sensor may be included on an upper layer of a display panel. The upper layer of the display panel may be a location which contacts a touch sensing layer for sensing a touch.

The controller 180 may determine that the code scanning situation is sensed, if information for the light received via the optical sensor matches information for the predetermined light.

In another embodiment, the controller 180 may sense the code scanning situation via a glance sensor.

The glance sensor (not shown) may be located adjacent to the front camera 121a.

The glance sensor is a sensor functioning as a proximity sensor and a camera, and may always operate to be turned on.

The controller 180 may determine that the code scanning situation is sensed, if information of light received from the glance sensor matches the information of the predetermined light.

A process of sensing the code scanning situation by using the front camera 121a and the illumination sensor will be described with reference to the accompanying drawings.

Figure 6A:
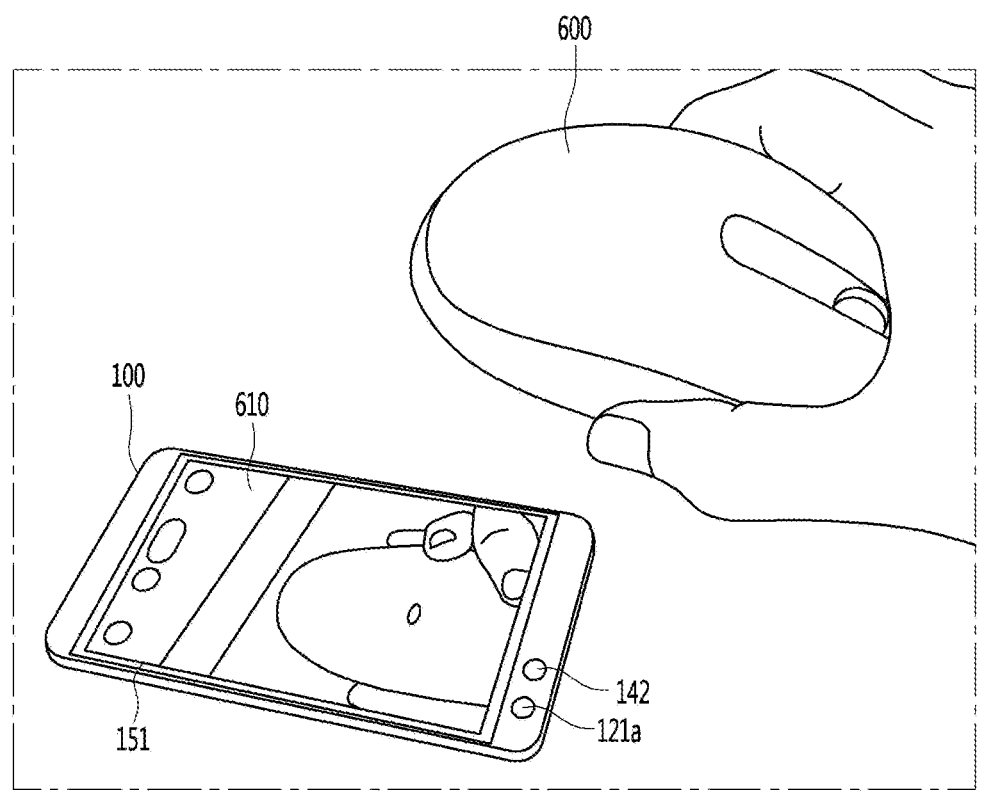
FIGS. 6A and 6B are views illustrating a process of sensing a code scanning situation, by using at least one of a front camera and an illumination sensor according to an embodiment of the present disclosure.
Figure 6B:
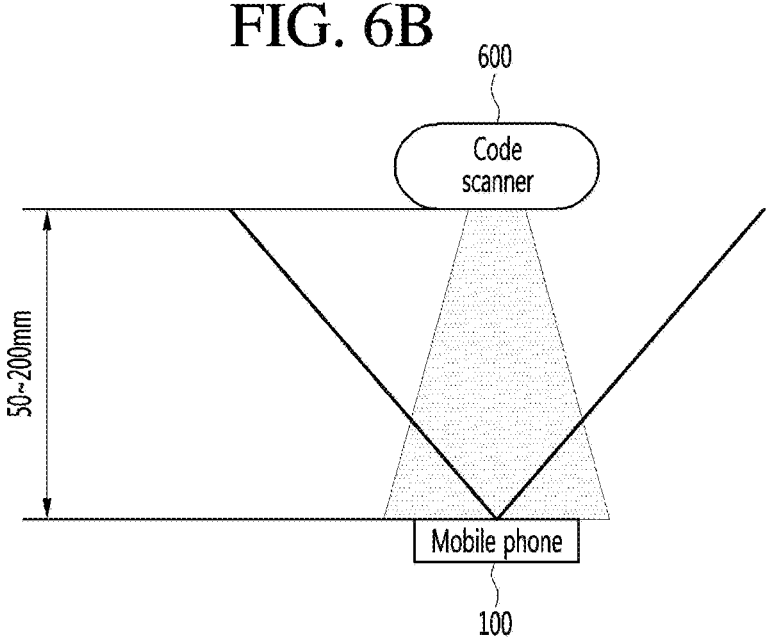

FIGS. 6A and 6B are views illustrating a process of sensing a code scanning situation, by using at least one of a front camera and an illumination sensor according to an embodiment of the present disclosure.

Referring to FIG. 6A, the mobile terminal 100 displays an image 610 of a code scanner 600 received via the front camera 121a on the display 151.

As one example, the controller 180 may determine that the code scanning situation is sensed, if a shape of light included in the image 610 of the code scanner 600 is sensed and the shape of the light has the predetermined shape. The shape of the sensed light may have a rectangular shape, but this is only an example.

The front camera 121a may be included in the sensing unit 140.

Referring to FIG. 6B, typically, a distance between the code scanner 600 and the mobile terminal 100 belongs to a range from 50 to 200 mm. In addition, a view angle of the front camera 121a is in a range from 80 degrees to 135 degrees, and a view angle of the code scanner 600 is about 20 degrees.

Since the view angle of the front camera 121a is greater than the view angle of the code scanner 600, the controller 180 may sense the shape of light which the front camera 121a captures.

The controller 180 may sense the code scanning situation of the code scanner 600, by using the sensed shape of the light.

As another example, the controller 180 may determine that the code scanning situation is sensed, if the intensity of light measured via the illumination sensor 142 and the shape of the light included in the image 610 of the code scanner 600 is equal to or more than the predetermined intensity.

In another embodiment, the controller 180 may determine that the code scanning situation is sensed, if the image 610 of the code scanner 600 matches an image of the code scanner previously stored in the memory 170. That is, the scanning situation may be sensed sing an image matching algorithm.

FIG. 5 will be described again.

The controller 180 displays a code for a first payment task on the display unit 151, if the code scanning situation is sensed (S503).

In an embodiment, the controller 180 may control the display unit 151 to automatically display the code for the first payment task, if the code scanning situation is sensed.

The first payment task may be one of a task for payment for goods, a task for getting a discount off a settlement price, and a task for collection of loyalty points for the settlement price.

To that end, the code for the first payment task may be one of a payment code, a discount code and a loyalty code.

The code may be one of a QR code or a bar code.

The step S503 will be described with reference to the accompanying drawings.

Figure 7:
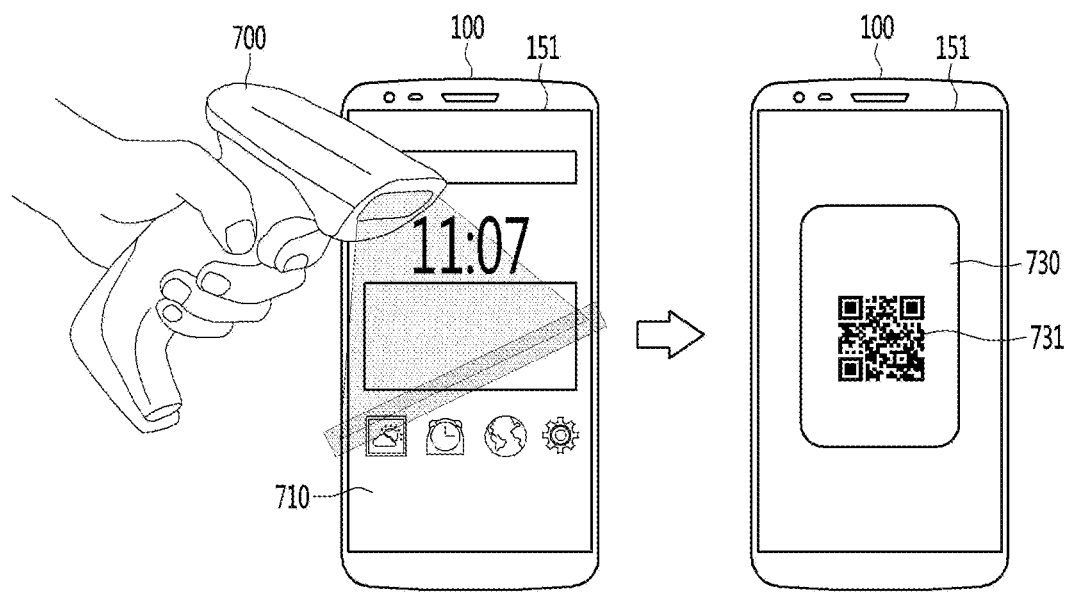
FIG. 7 is a view illustrating a process of automatically displaying a code, if a code scanning situation is sensed according to an embodiment of the present disclosure.

FIG. 7 is a view illustrating a process of automatically displaying a code, if a code scanning situation is sensed according to an embodiment of the present disclosure.

Referring to FIG. 7, the mobile terminal 100 displays a home screen 710 on the display unit 151.

The controller 180 may automatically display a QR code 731, if the code scanning situation in which the code intends to be scanned via a code scanner 700 is sensed.

The QR code 731 may be a code corresponding to a card set by the user or set by a default. Herein, the card may be one of a card for payment for goods, a card for a discount and a card for collection of loyalty points.

The QR code 731 may be displayed along with a card image 730 corresponding to the card. That is, the QR code 731 may be displayed on the card image 730.

The controller 180 may convert the home screen 710 displayed on the display unit 151 into the QR code 731, if the code scanning situation is sensed.

To that end, the user does not have to perform a task for executing an application for payment and a task for selecting the code. That is, the user may perform the task for payment for goods without a complicated process, thus improving convenience.

Figure 8:
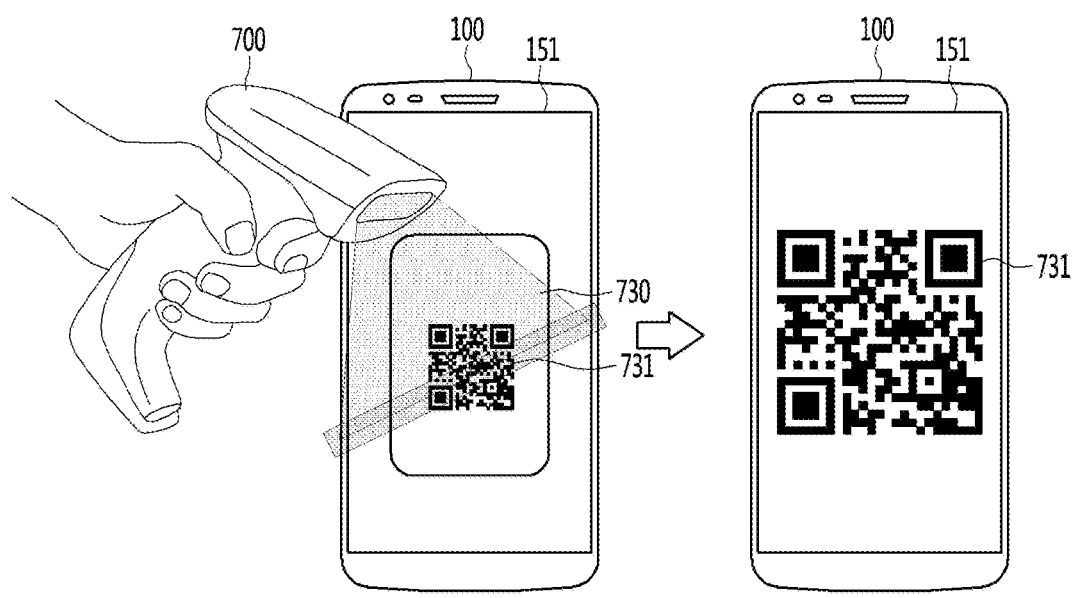
FIG. 8 is a view illustrating a process of automatically enlarging a code, if a code scanning situation is sensed according to an embodiment of the present disclosure.

FIG. 8 is a view illustrating a process of automatically enlarging a code, if a code scanning situation is sensed according to an embodiment of the present disclosure.

In particular, FIG. 8 is an embodiment illustrating a case that the code scanning situation is sensed in a state in which the card image 730 and the QR code 731 for the payment task are displayed.

The controller 180 may enlarge the QR code 731, if the code scanning situation is sensed in a state in which the card image 730 and the QR code 731 are displayed.

In another embodiment, the controller 180 may make the card image 730 disappear, by enlarging the QR code 731.

The code scanner 700 may recognize the QR code 731 more exactly and quickly, as the QR code 731 is enlarged.

Meanwhile, in an embodiment of FIG. 8, the controller 180 may determine that the code scanning situation is sensed, if the mobile terminal 100 slopes by a predetermined gradient. A gyro sensor may be used for this.

Meanwhile, the controller 180 may adjust a direction in which the code is displayed according to a direction of the light outputted from the code scanner, while enlarging the code according to the sensing of the code scanning situation.

Figure 9:
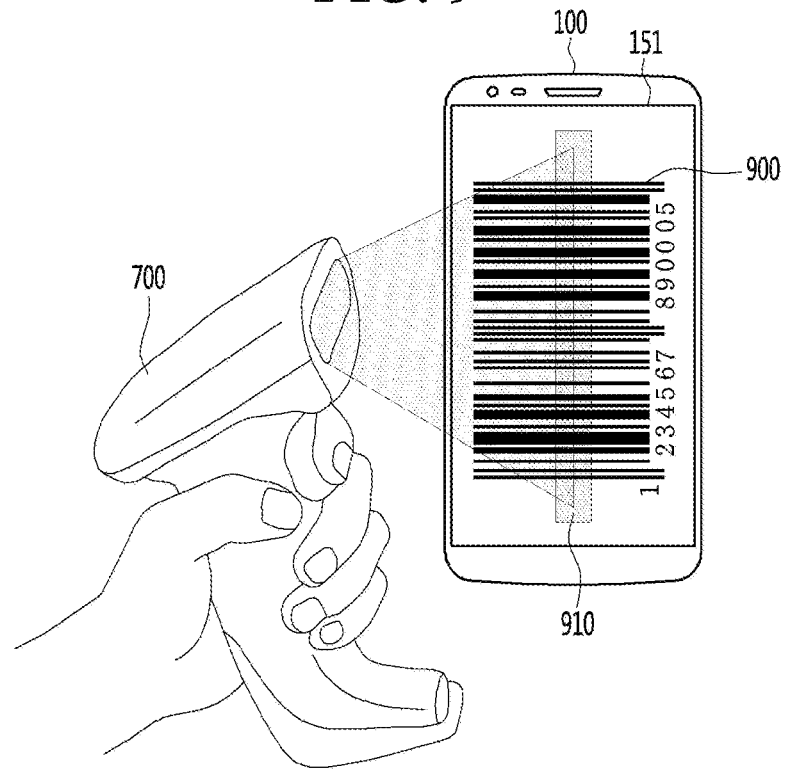
FIGS. 9 and 10 are views illustrating an example of adjusting a display direction of a code to fit an incident direction of light outputted from a code scanner according to an embodiment of the present disclosure.
Figure 10:
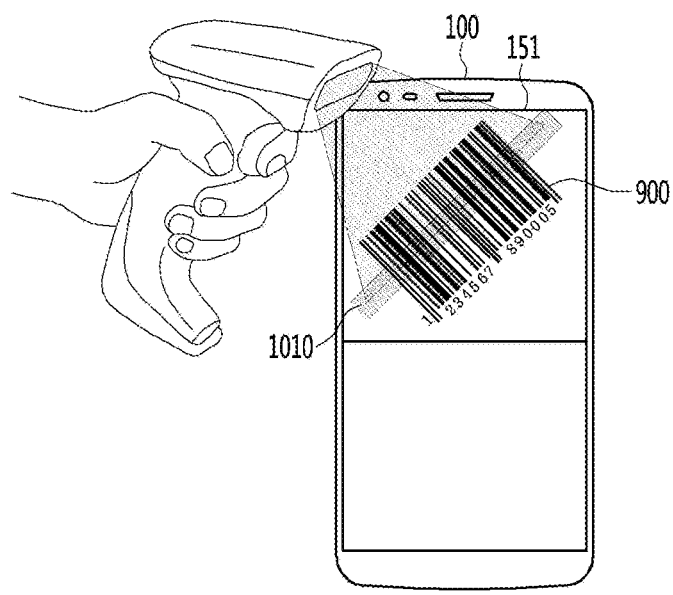

The descriptions of adjusting the direction of the code will borrow from the teachings of FIGS. 9 and 10 herein.

FIG. 5 will be described again.

According to another embodiment of the present disclosure, the controller 180 may adjust and provide the direction of the code according to the direction of the light outputted from the code scanner.

FIGS. 9 and 10 are views illustrating an example of adjusting a display direction of a code to fit an incident direction of light outputted from a code scanner according to an embodiment of the present disclosure.

FIGS. 9 and 10 are assumed to be a process after the code is automatically displayed by sensing the code scanning situation, but these figures are not limited thereto.

That is, the code may be displayed while the display direction of the code is changed by sensing the code scanning situation.

First, referring to FIG. 9, the mobile terminal 100 may display a bar code 900 on the display unit 151 according to the recognition of the code scanning situation.

The controller 180 may recognize the direction of the light outputted from the code scanner 700 and may adjust a display direction of the bar code 900 to fit the direction of the recognized light.

Referring to FIG. 9, if the direction of the light outputted from the code scanner 700 makes a vertical line 910, the controller 180 may adjust the display direction of the bar code 900 vertically.

Referring to FIG. 10, if the direction of the light outputted from the code scanner 700 makes a diagonal line 1010 having a specific angle, the controller 180 may adjust the display direction of the bar code 900 to fit the diagonal line 1010.

At the same time, the controller 180 may sense that a location of the code scanner 700 is in an upper left side of the mobile terminal 100, and may display the bar code 900 by moving a location of the bar code 900 upwardly.

According to embodiments of FIGS. 9 and 10, the user of the mobile terminal 100 or the user of the code scanner 700 does not have to turn the mobile terminal 100 and the code scanner 700, in order to fit a direction and an angle between the code scanner 700 and the mobile terminal 100.

To that end, the user may perform the payment task conveniently, and the code scanner 700 may obtain the code information corresponding to the bar code 900 exactly and rapidly.

FIG. 5 will be described again.

The controller 180 determines that the first payment task is completed via the displayed code (S505).

In an embodiment, the controller 180 may determine that the first payment task is completed, based on the change of an amount of the light.

The controller 180 may determine that the first payment task is completed if a variation of the amount of the light is equal to or more than an amount of a predetermined amount.

In another embodiment, the controller 180 may determine that the first payment task is completed, based on an audio outputted from the code scanner.

The controller 180 may determine that the first payment task is completed, if an audio inputted in the microphone 122 is consistent with a previously stored audio.

In another embodiment, the controller 180 may determine that the first payment task is completed, based on the change of the amount of the light and the audio outputted from the code scanner.

In another embodiment, the controller 180 may determine that the first payment task is completed, by tracking a shape of light outputted by a code scanner.

The step S505 will be described with reference to the accompanying drawings.

Figure 11:
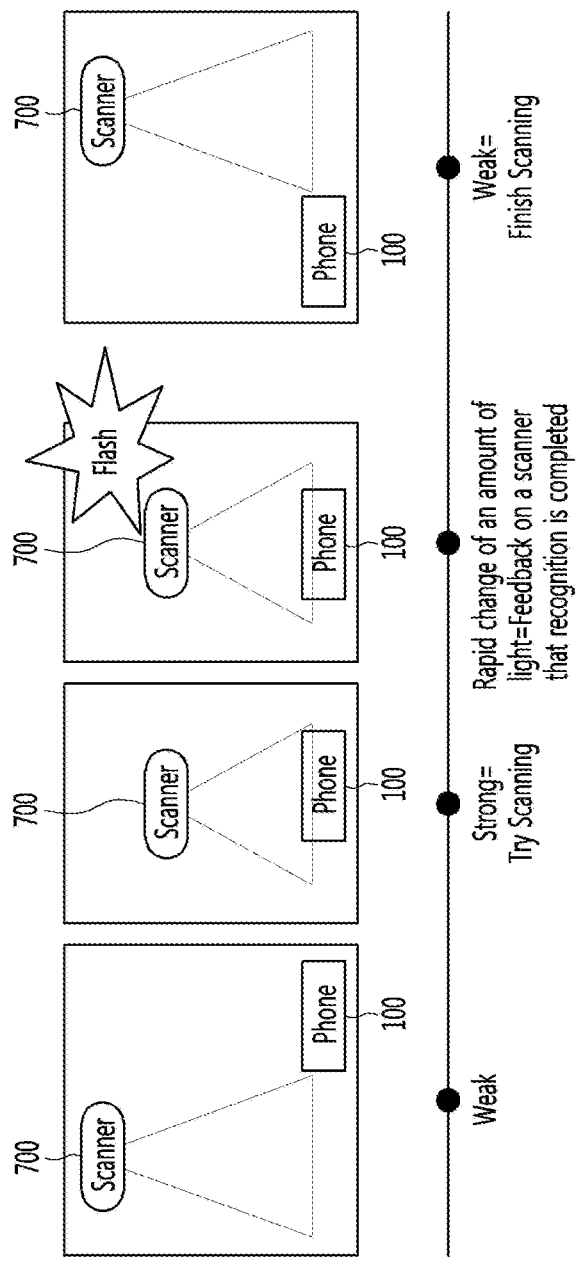
FIG. 11 is a view illustrating a process of determining whether a payment task is completed, based on a change of an amount of light according to an embodiment of the present disclosure.

FIG. 11 is a view illustrating a process of determining whether a payment task is completed, based on a change of an amount of light according to an embodiment of the present disclosure.

Referring to FIG. 11, the mobile terminal 100 may measure the intensity or the amount of the light outputted from the code scanning scanner 700 via the illumination sensor.

If the light outputted from the code scanner 700 does not reach the mobile terminal 100, the controller 180 may determine that the code scanner 700 does not move closely. That is, the intensity of the light measured via the illumination sensor is low.

If the measured intensity of the light is equal to or more than the predetermined intensity, the controller 180 may determine that the code scanner moves closer to the mobile terminal 100 and tries scanning the code.

If the code scanner 700 recognizes the code displayed on the mobile terminal 100, the code scanner 700 may temporarily output strong light indicating that the code is recognized.

If the variation of the amount of the light is equal to or more than the predetermined amount, the controller 180 may determine that the payment task is completed as the code scanner 700 recognizes the code.

In another embodiment, if the variation of the amount of the light is equal to or more than a predetermined amount, and after some time, the intensity of the light is less than a predetermined intensity, the controller 180 may determine that the payment task is completed.

In another embodiment, if the variation of the amount of the light is equal to or more than the predetermined amount, and the audio inputted in the microphone 122 is consistent with the previously stored audio, the controller 180 may determine that the payment task is completed.

The previously stored audio may be an audio indicating that the code scanner 700 recognized the code.

Next, an example of determining that the payment task is completed by tracking a shape of the light outputted from the code scanner 700 will be described.

Figure 12:
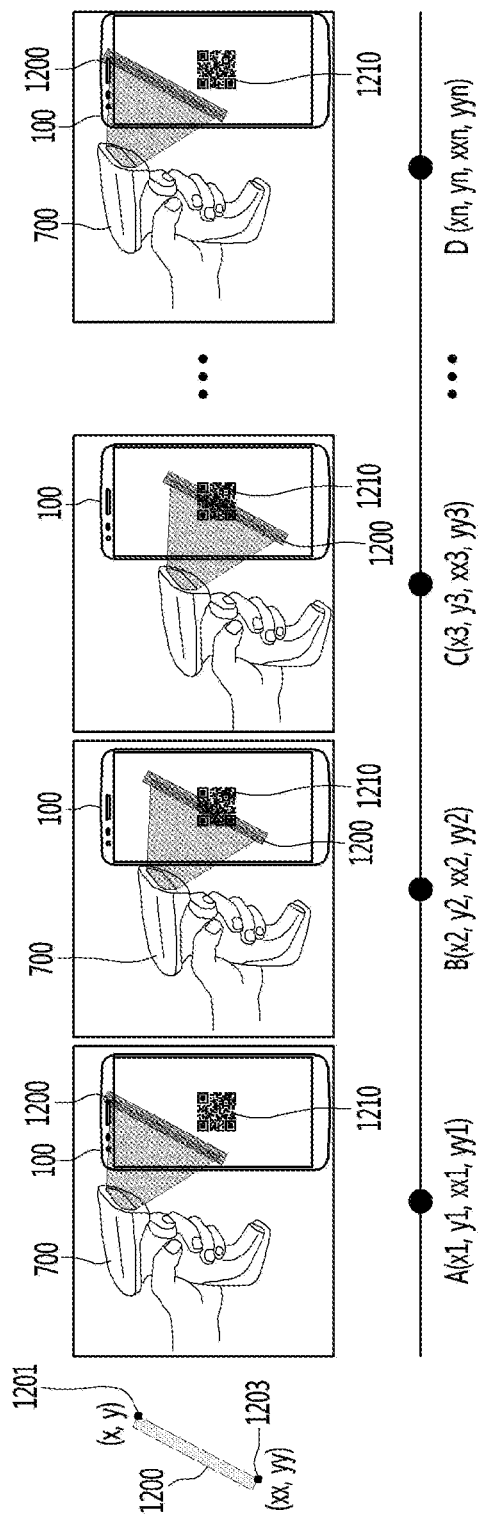
FIG. 12 is a view illustrating a process of determining that a payment task is completed, by tracking a shape of light outputted by a code scanner according to another embodiment of the present disclosure.

FIG. 12 is a view illustrating a process of determining that a payment task is completed, by tracking a shape of light outputted by a code scanner according to another embodiment of the present disclosure.

In FIG. 12, it is assumed that the shape of the light outputted from the code scanner 700 is a rectangular 1200, and the mobile terminal 100 displays a QR code 1200 according to the recognition of the code scanning situation.

In addition, it is assumed that the rectangle 1200 is tracked by using coordinates x,y of a first vertex 1201 and coordinates xx1, yy2 of a second vertex 1203 perpendicular to the first vertex 1201 of the rectangle 1200.

The controller 180 may track a location of the optical shape rectangle 1200, by using the optical sensor embedded in the display unit 151.

The controller 180 may determine that the payment task is not completed, if the location of rectangle 1200 is A.

Thereafter, if the location of the rectangle 1200 is in location C by passing B, and is fixed over a predetermined time, the controller 180 may determine that the payment task is completed by recognizing the QR code 1200 by the code scanner 700.

FIG. 5 will be described again.

If the first payment task is completed, the controller 180 displays a screen for a second payment task associated with the first payment task (S507), and performs the second payment task (S509).

In an embodiment, the second payment task can be changed according the user's setting.

In addition, the controller 80 may perform another payment task in order, after performing the second payment task.

The steps S507 and S509 will be described with reference to the accompanying drawings.

Figure 13:
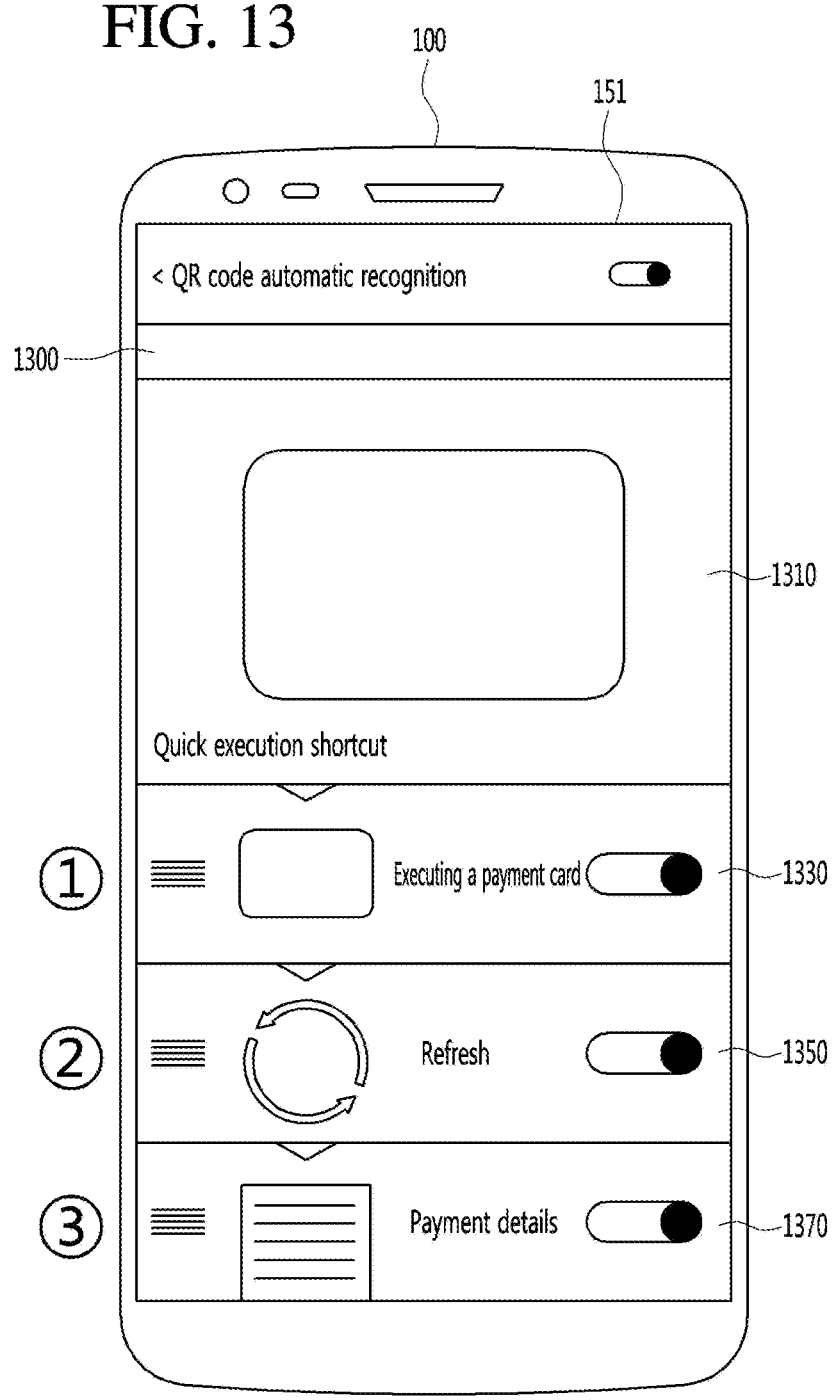
FIG. 13 is a view illustrating a payment task setting screen for setting a payment task which will be automatically performed, after recognizing a code according to an embodiment of the present disclosure.

First, FIG. 13 is a view illustrating a payment task setting screen for setting a payment task which will be automatically performed, after recognizing the code according to an embodiment of the present disclosure.

In FIG. 13, it is assumed that the first payment task according to the recognition of the code is a loyalty task.

Referring to FIG. 13, the display unit 151 of the mobile terminal 100 displays a payment task setting screen 1300. The payment task setting screen 1300 may be a screen displayed according to the execution of the payment application.

The payment task setting screen 1300 may include a first item 1310 including information for the first payment task automatically performed according to the recognition of the code, and second, third and fourth items 1330, 1350, 1370 corresponding to each of second, third and fourth payment tasks which will be performed in order, after performing the first payment task.

The second payment task item 1330 may be an item for setting a credit card to perform payment for goods, after collecting loyalty points.

The third task item 1350 may be an item for renewing payment information, after collection of loyalty points and credit card payment.

The fourth task item 1370 may be an item for providing payment details according to the renewal of the payment information.

The user may previously designate payment tasks to be performed, after recognizing the code, as described above.

Figure 14:
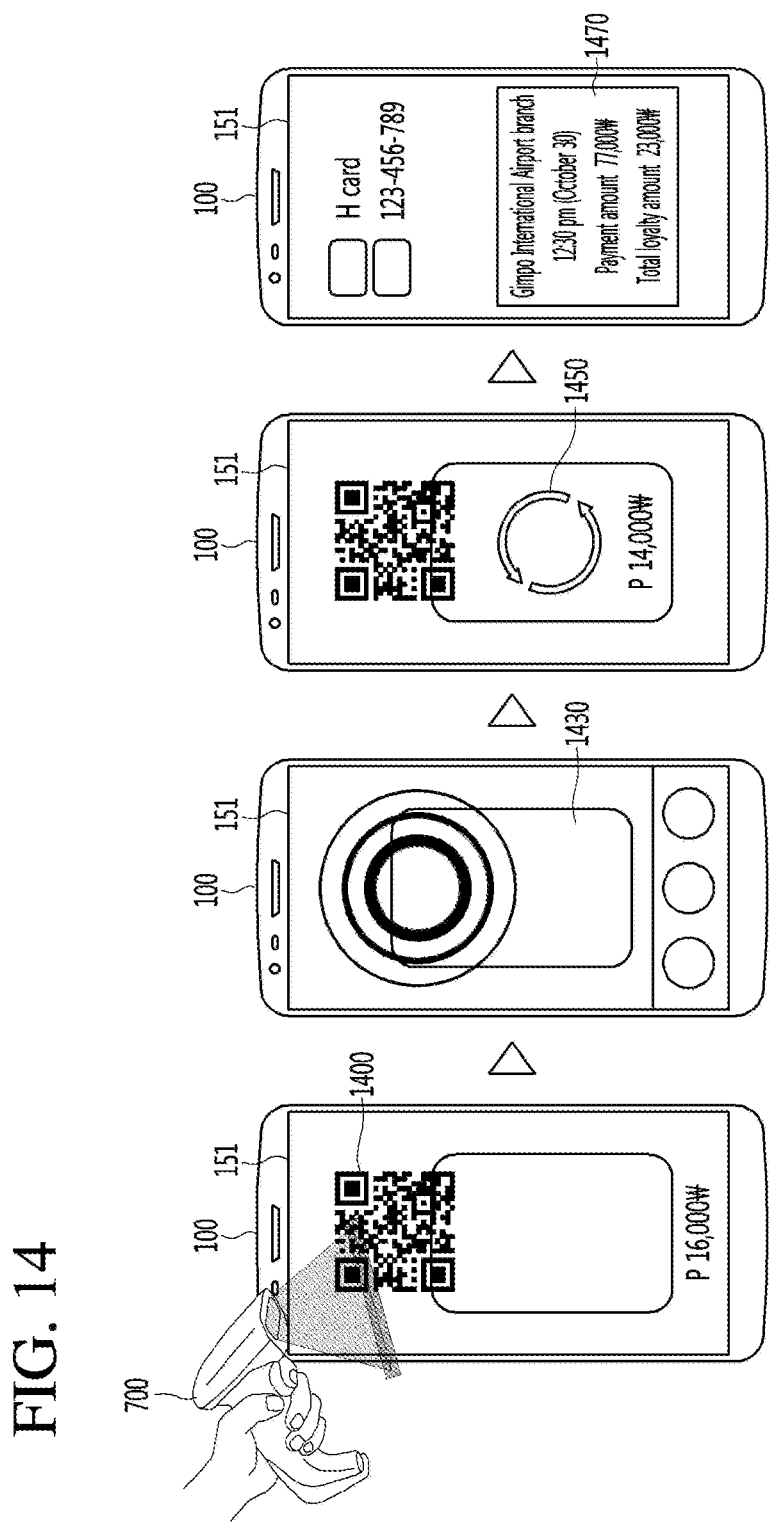
FIG. 14 is a view illustrating a process of automatically performing payment tasks by the mobile terminal, after recognizing the code in accordance with a setting result of FIG. 13.

FIG. 14 is a view illustrating a process of automatically performing payment tasks by the mobile terminal, after recognizing the code in accordance with a setting result of FIG. 13.

Referring to FIG. 14, the mobile terminal 100 may automatically display a QR code 1410 according to the sensing of the code scanning situation. The code scanner 700 may transmit payment task information to the mobile terminal 100 via a server (or directly), by recognizing the QR code 1410.

The mobile terminal 100 may display information for a record of the collection of the loyalty points, by receiving the payment task information. That is the assumption that the first payment task is performed.

Then, the controller 180 may perform the second payment task for credit card payment for goods, as set via the payment task setting screen of FIG. 13. That is, the controller 180 may display a card image 1430 corresponding to a credit card.

The controller 180 performs payment for goods via the corresponding the credit card.

Then, the controller 180 displays a renewal screen 1450 indicating a process of renewing the record of the collection of the loyalty points and the settlement price.

Then, the controller 180 may automatically display detailed payment information 1470 including the settlement price, a total amount of loyalty points and the like.

As described above, from the recognition of the code, subsequent payment tasks may be automatically performed. Thus, the user may make payment conveniently without a complicated process.

Next, an example of, if a plurality of QR codes are created to one integration QR code, performing the plurality of payment tasks in order by recognizing the integration QR code, will be described.

Figure 15:
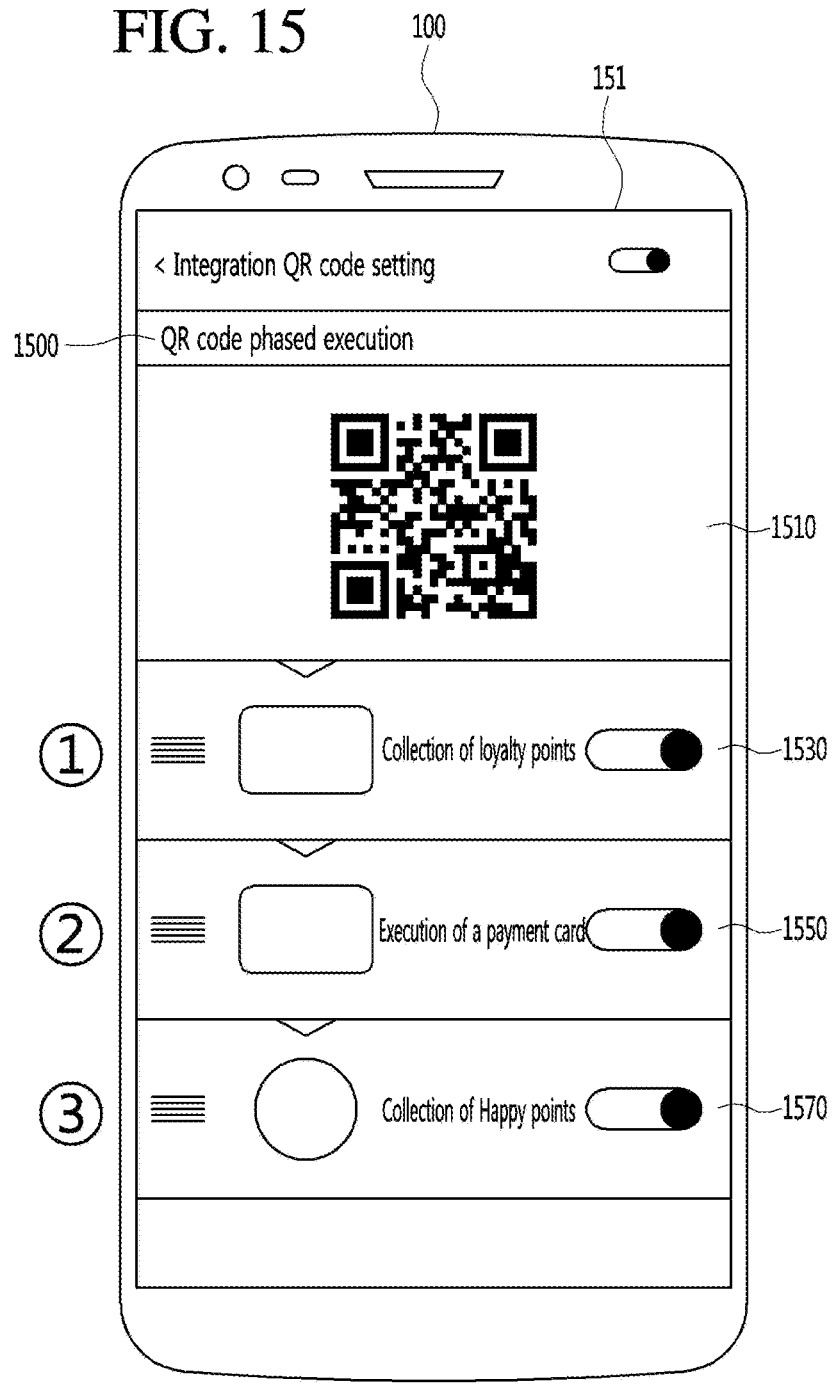
FIGS. 15 and 16 are views illustrating examples of executing a plurality of payment tasks according to a set order, by creating a plurality of QR codes to one integration QR code according to an embodiment of the present disclosure.
Figure 16:
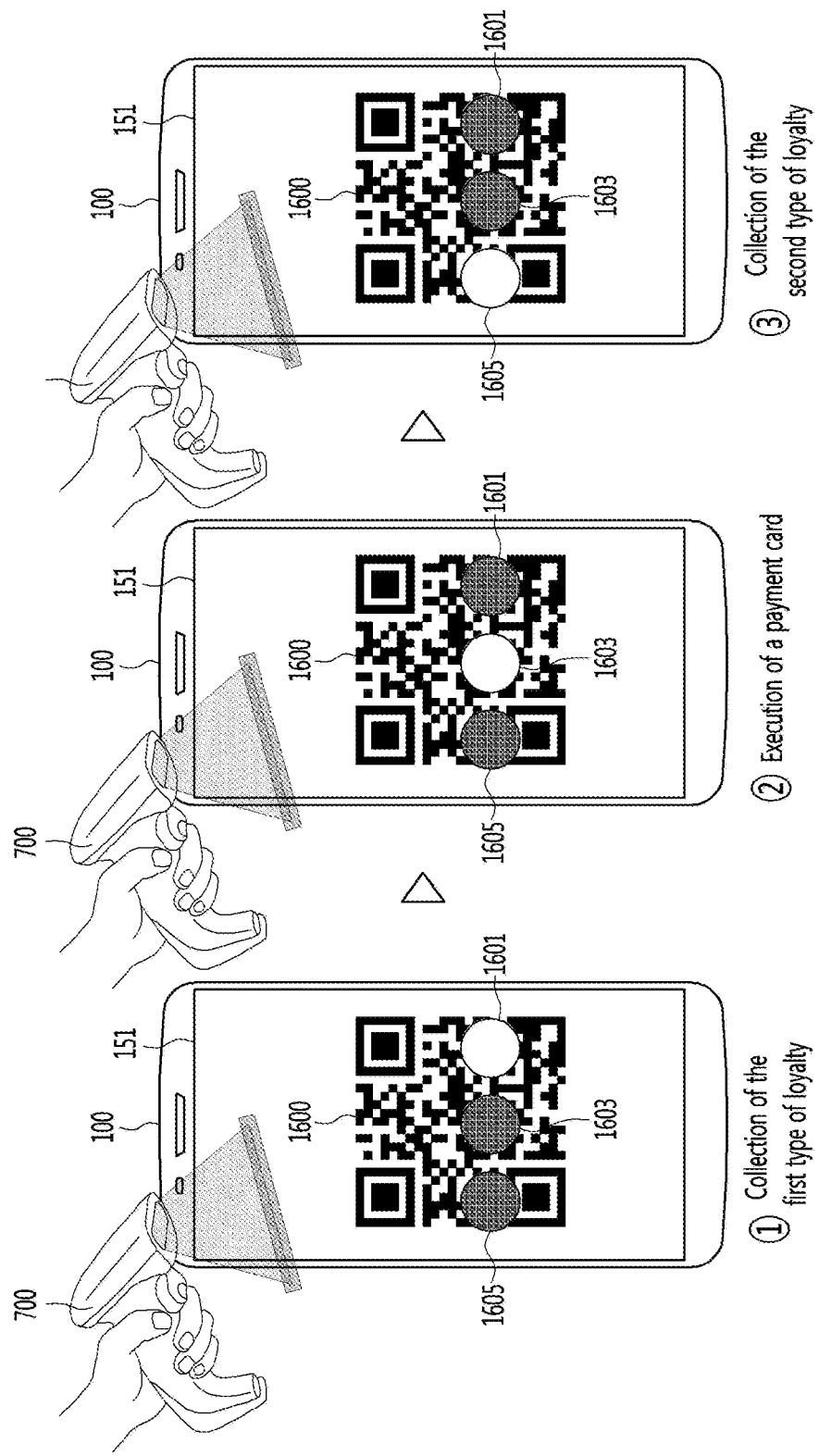

FIGS. 15 and 16 are views illustrating examples of executing a plurality of payment tasks according to a set order, by creating a plurality of QR codes to one integration QR code according to an embodiment of the present disclosure.

With reference to FIG. 15, the display unit 151 of the mobile terminal 100 displays the integration QR code setting screen 1500.

The integration QR code setting screen 1500 may be a screen for setting the plurality of payment tasks to be performed, by creating one integration code.

The integration QR code setting screen 1500 may include an integration QR code 1510, a first payment task item 1530, a second payment task item 1550 and a third payment task item 1570.

The integration QR code 1510 may be a code made by synthesizing a plurality of QR codes corresponding to each of the plurality of payment tasks. The integration QR code 1510 may contain code information corresponding to each of the plurality of QR codes.

The first payment task item 1530, which corresponds to a first QR code, may be an item for setting a first type of loyalty.

The second payment task item 1550, which corresponds to a second QR code, may be an item for setting a card for payment for goods.

The third payment task item 1570, which corresponds to a first QR code, may be an item for setting a second type of loyalty.

FIG. 16 will be described using a setting result of FIG. 15.

With reference to FIG. 16, the display unit 151 of the mobile terminal 100 displays the integration QR code 1600.

The controller 180 may automatically display the integration QR code 1600, if the code scanning situation is sensed.

A plurality of icons 1601, 1603, 1605 may be displayed on the integration QR code 1600.

Each of the plurality of icons 1601, 1603, 1605 may be an icon corresponding to each of the plurality of payment task items 1530, 1550, 1570 of FIG. 15.

That is, the first icon 1601 is an icon corresponding to the first payment task item 1530, and may identify what the payment task performed via the code scanner 700 is.

The controller 180 may perform a task for the first type of loyalty according to the setting of FIG. 15, when the code scanner 700 primarily recognizes the integration QR code 1600.

When the code scanner 700 recognizes the integration QR code 1600, the first icon 1601 may be displayed as distinguished from the second icon 1603 and the third icon 1605. For example, the first icon 1601 may be highlighted, and the second and third icons 1603, 1605 may be dimmed.

Then, the controller 180 may determine that the payment task corresponding to the first payment task item 1530 is completed, based on the variation of the amount of the light and the audio.

If the variation of the amount of the light is equal to or more than the predetermined amount, and the audio is a predetermined audio, the controller 180 may determine that the payment task corresponding to the first payment task item 1530 is completed.

If the payment task corresponding to the first payment task item 1530 is completed, the controller 180 may identify the payment task which is currently performing, by highlighting the second icon 1603.

The controller 180 may perform the payment task corresponding to the second and third payment task 1550, 1570, in order according to the setting of FIG. 15.

According to another embodiment of the present disclosure, the mobile terminal 100 may perform the plurality of tasks at a time, by using the integration QR code.

Figure 17:
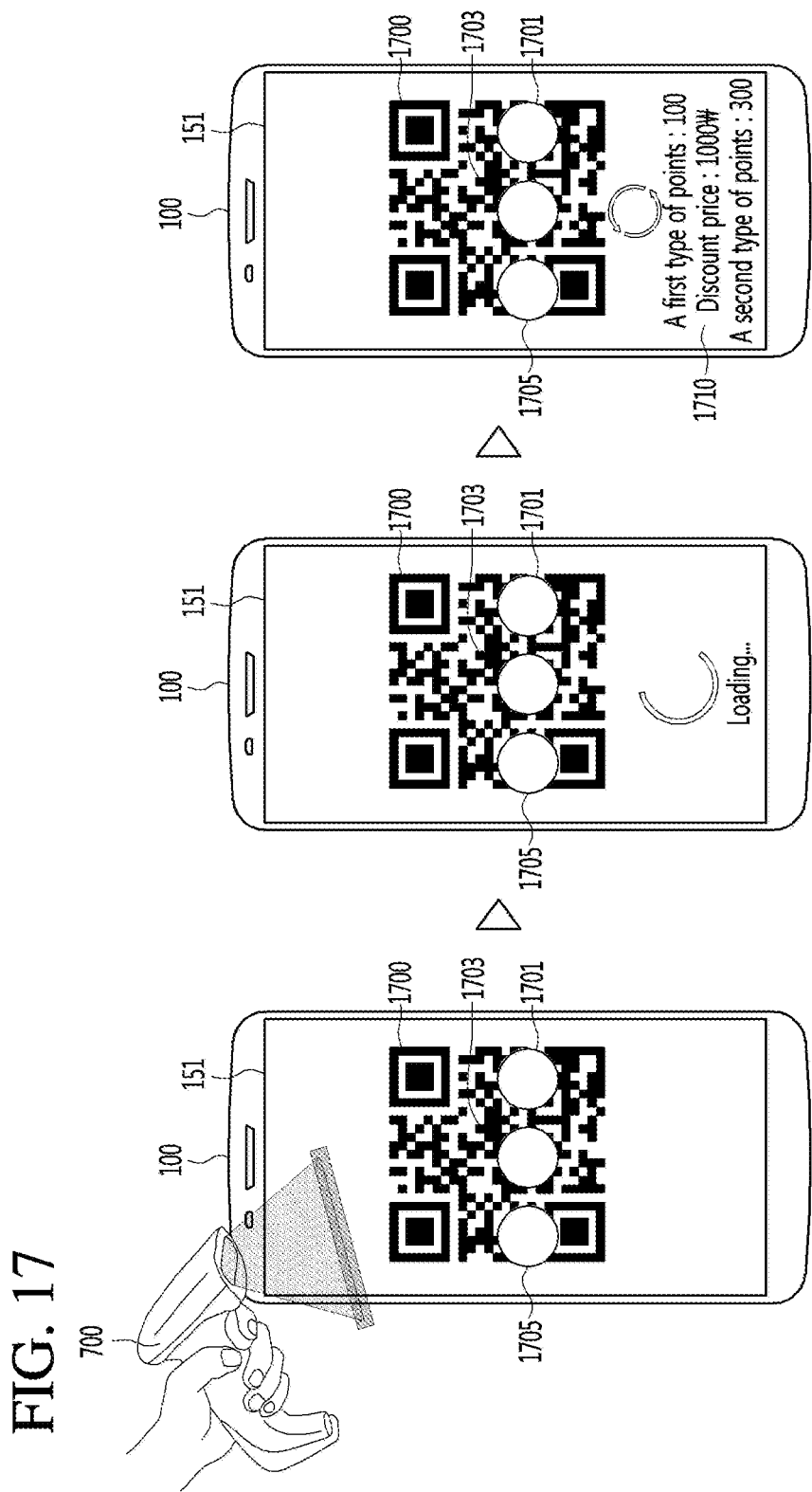
FIG. 17 is a view illustrating a process of performing a plurality of payment tasks at a time, by using the integration QR code according to an embodiment of the present disclosure.

FIG. 17 is a view illustrating a process of performing a plurality of payment tasks at a time, by using the integration QR code according to an embodiment of the present disclosure.

The display unit 151 of the mobile terminal 100 displays the integration QR code 1700.

The controller 180 may display the integration QR code 1700 which was automatically predetermined, if the code scanning situation is sensed.

The integration QR code 1700 may include discount card information for a discount off the settlement price and card information for collection of the first and second types of loyalty points.

The first icon 1701 may be an icon for identifying the first type of loyalty, the second icon 1730 may be an icon for identifying the discount, and the third icon 1705 may be an icon for identifying the second type of loyalty, respectively.

If the integration QR code 1700 is recognized via the code scanner 700, the controller 180 may transmit integration code information which the integration QR code 1700 contains, to the code scanner 700.

Then, the controller 180 may sense that the plurality of payment tasks are completed, based on at least one of the variation of the amount of the light and the audio outputted from the code scanner 700.

If performance of the plurality of payment tasks is completed, the controller 180 may display detailed payment task information 1710 received from the code scanner 700 or the external server on the display unit 151.

The user may quickly perform the plurality of payment tasks at a time, by using the integration QR code 1700.

According to another embodiment of the present disclosure, if the payment task performed after the completion of the first payment task is not set, the payment task subsequent according to the kind of the first payment task may be performed.

Figure 18:
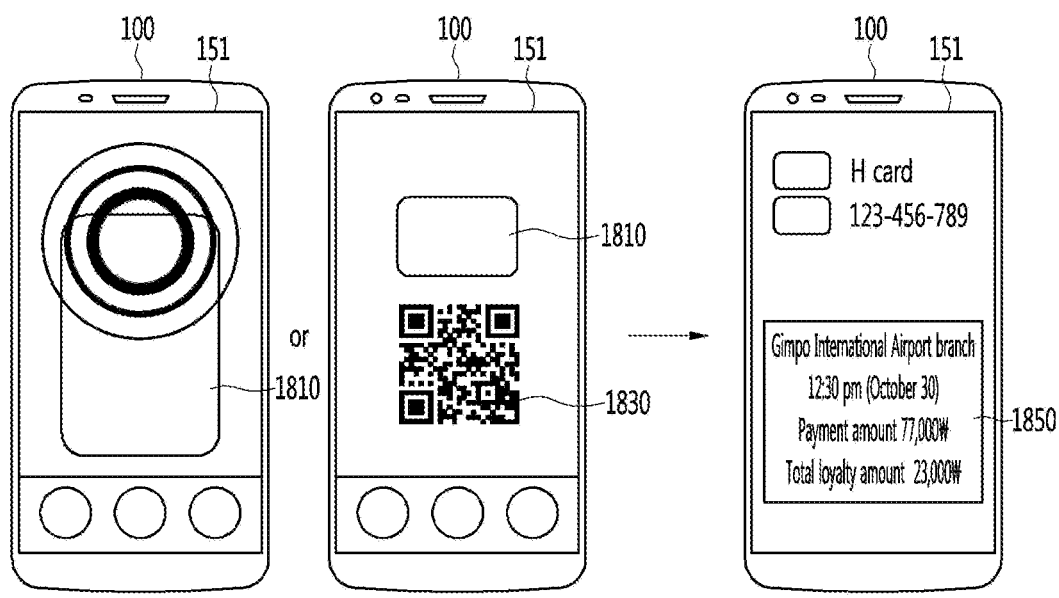
FIGS. 18 and 19 are views illustrating a processor of automatically performing a next payment task according to the kind of a first payment task, if a payment task performed after completing the first payment task is not set, according to an embodiment of the present disclosure.
Figure 19:
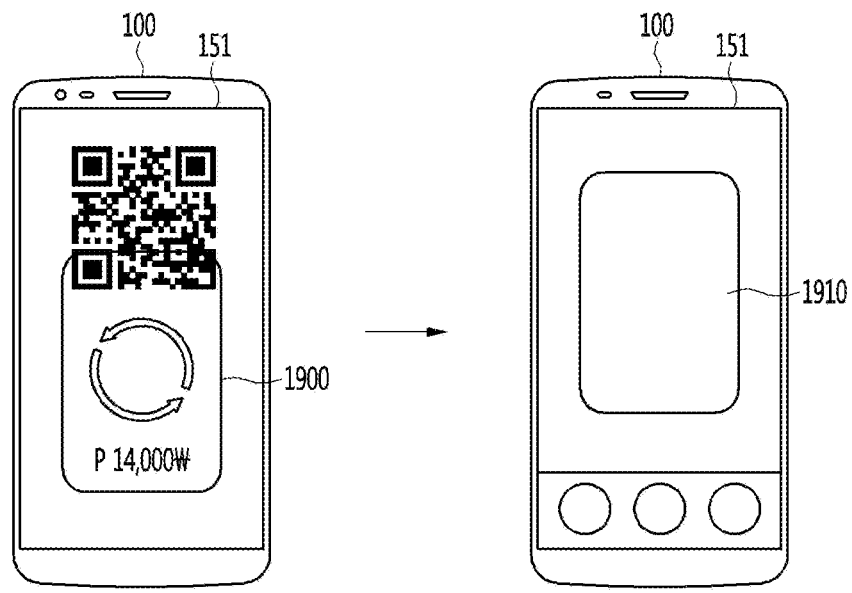

FIGS. 18 and 19 are views illustrating a processor of automatically performing a next payment task according to the kind of a first payment task, if a payment task performed after completing the first payment task is not set, according to an embodiment of the present disclosure.

First, FIG. 18 illustrates a case that the first payment task of getting a discount off prices for goods via a discount benefit card is completed.

If the first payment task is a task of getting a discount benefit, the controller 180 may automatically display a card image 1810 corresponding to the credit card for payment for goods.

In this case, the controller 180 may convert the credit card information into a magnetic field by using a magnetic security transmission system, and may transmit the converted magnetic field to a payment terminal.

In another embodiment, if the first payment task is a task of getting a discount benefit, the controller 180 may display a card image 1810 corresponding to a credit card for credit payment for goods and a QR code 1830 including information for the credit card.

The payment for goods may be performed via the magnetic security transmission system or a system to read the QR code 1830.

The controller 180 may display the detailed payment information 1850 including a record of the payment for goods and discount contents, after performing the payment.

Next, FIG. 19 will be described.

FIG. 19 illustrates a case that the first payment task of collecting the loyalty points via loyalty benefits is completed.

If the first payment task is the task of collecting the loyalty points, the controller 180 may perform a renewal procedure for renewing the collection of the loyalty points. To that end, information 1900 for a total of collected loyalty points may be displayed.

Then, the controller 180 may automatically display the card image 1810 corresponding to the credit card for payment for goods. In this case, the controller 180 may convert the credit card information into the magnetic field by using the magnetic security transmission system, and may transmit the converted magnetic field to a payment terminal.

The payment for goods may be performed via the magnetic security transmission system.

The controller 180 may display the detailed payment information 1850 including the record of the payment for goods and the discount contents, as illustrated in FIG. 18, after performing the payment.

Figure 20:
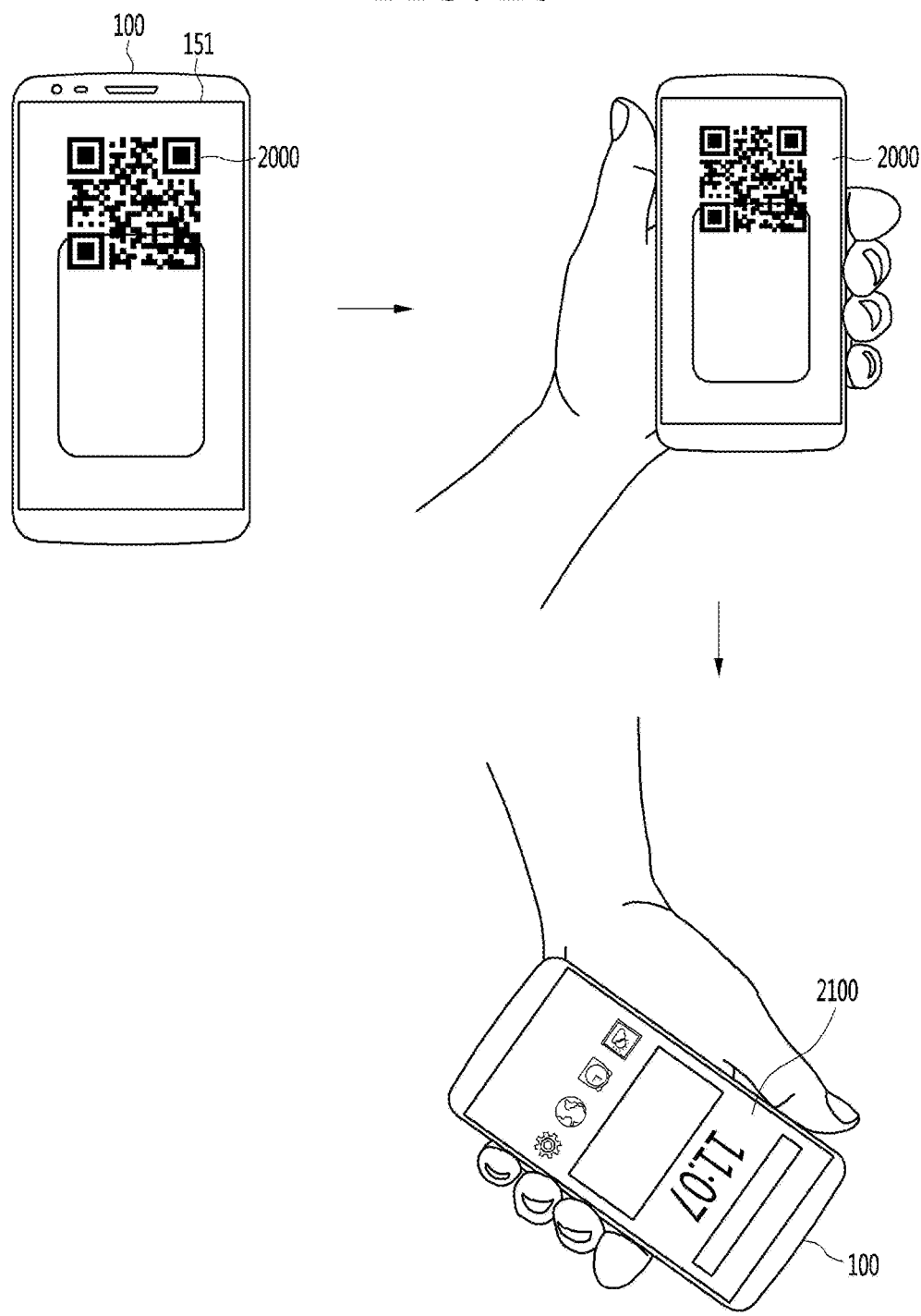
FIG. 20 is a view illustrating a process of figuring out that all the payment tasks are completed according to an embodiment of the present disclosure.

FIG. 20 is a view illustrating a process of figuring out that all the payment tasks are completed according to an embodiment of the present disclosure.

Referring to FIG. 20, the display unit 151 of the mobile terminal 100 displays a payment task screen 2000.

The controller 180 may determine that all payment tasks are terminated, if it is recognized that after receiving the mobile terminal 100 from a clerk, the mobile terminal 100 moves downwardly.

However, the present disclosure does not have to be limited thereto, and various predetermined gestures may be recognized as the kind of payment tasks.

If a gesture of a predetermined user is sensed, the controller 180 may convert the payment task 2000 to a home screen 2100.

Next, FIGS. 21 and 22 will be described.

Figure 21:
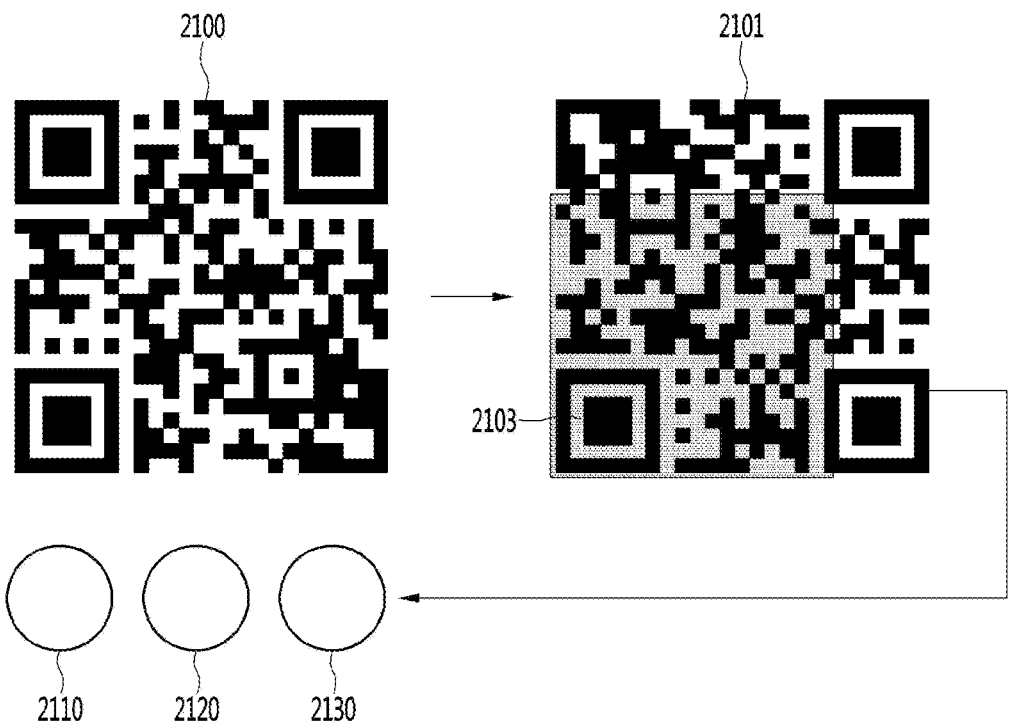
FIGS. 21 and 22 are views illustrating examples of changing an integration code for performing only a payment task corresponding to one code, if a plurality of codes are created to one integration code.
Figure 22:
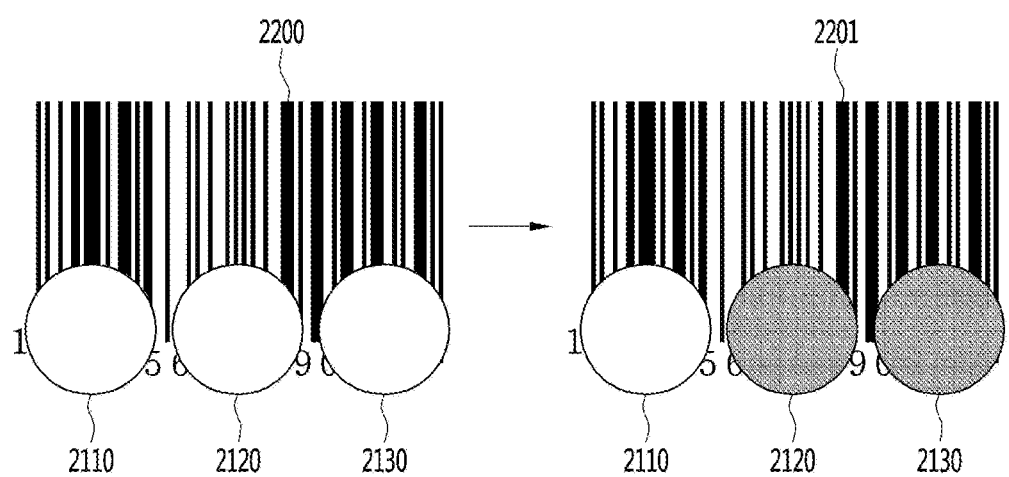

FIGS. 21 and 22 are views illustrating examples of changing an integration code for performing only a payment task corresponding to one code, if a plurality of codes are created to one integration code.

In particular, FIGS. 21 and 22 are scenarios which may be applied to a situation in which an integration code cannot be used. That is, these figures may be applied to a situation in which the user should select one from a discount benefit for goods or a loyalty benefit in a store.

In FIGS. 21 and 22, if the code scanning situation is sensed, the integration code is presumed to be displayed.

First, referring to FIG. 21, the mobile terminal 100 displays an integration QR code 2100. The integration QR code 2100 may include code information corresponding to the collection of the loyalty points, code information for the discount benefits and code information for the payment for goods.

In addition, a first icon 2110 indicating a loyalty card, a second icon 2120 indicating a credit card and a third icon 2130 indicating a discount card for discount benefits may be arranged on the integration QR code 2100 or in one side of the integration QR code 2100.

If the third icon 2130 is selected, the controller 180 may dim the other second area 2103 except a first area 2101 which contains information for discount benefits corresponding to a third icon 2130 among all areas of the integration QR code 2100.

To that end, the task for the discount benefits may be performed via the first area 2101.

Next, FIG. 22 will be described.

Referring to FIG. 22, the mobile terminal 100 may display an integration bar code 2200.

Similarly to FIG. 21, the first icon 2110 indicating the loyalty card, the second icon 2120 indicating the credit card and the third icon 2130 indicating the discount card for discount benefits may be arranged on the integration bar code 2200 or in one side of the integration bar code 2200.

If the third icon 2130 is selected, the controller 180 may convert the integration bar code 2200 into a bar code 2201 which contains information for the discount benefits corresponding to the third icon 2130.

Although the user uses the integration code, the user may conveniently perform only a desired payment task.

The present disclosure mentioned in the foregoing description may be implemented as a code which a computer may read in a medium recording a program. Computer-readable mediums include all kinds of recording machines which stores data readable by a computer system. Examples of computer-readable mediums include HDD (Hard Disk Drive), SSD (Solid State Disk), SDD (Silicon Disk Drive), ROM, RAM, CD-ROM, a magnetic tape, a floppy disk, an optical data storage device, and the like. In addition, the computer-readable medium may be realized in the form of a carrier wave (for example, a transmission over the Internet). The computer may include the controller 180 of the mobile terminal.

Therefore, in all aspect, the detailed description of the present disclosure is intended to be understood and interpreted as an exemplary embodiment of the present invention without limitation. The scope of the present invention shall be decided based upon a reasonable interpretation of the appended claims of the present invention and all modifications in the scope of the appended claims and their equivalents of the present disclosure shall be included in the scope of the present disclosure.

What is claimed is:

1. A mobile terminal, comprising:
  a memory;
  a display;
  a sensor configured to sense light emitted onto the display; and
  a controller configured to:
  obtain information for light output from a code scanner,
  compare the information for the light output from the code scanner with information for predetermined light stored in the memory, wherein the information for the predetermined light includes at least one of predetermined intensity of the light, a predetermined shape of the light and a predetermined color of the light,
  determine a code scanning situation is sensed if the information for the light output from the code scanner matches the information for the predetermined light, wherein the code scanning situation indicates the code scanner emitted the light onto the display for scanning a code for a payment task using the mobile terminal, automatically display a first code image for a first payment task in response to the determination of the code scanning situation, and display the first code image on the display with an orientation matching a direction of the light output from the code scanner.

2. The mobile terminal of claim 1, wherein the controller is further configured to automatically perform a second payment task associated with the first payment task, if the first payment task is completed via recognition of the first code image.

3. The mobile terminal of claim 2, wherein the controller is further configured to determine that the first payment task is completed, if a variation of an amount of the light output from the code scanner is equal to or more than a predetermined amount.

4. The mobile terminal of claim 2, further comprising a microphone,
wherein the controller is further configured to determine that the first payment task is completed, if an audio input in the microphone is a predetermined audio.

5. The mobile terminal of claim 4, wherein the controller is further configured to determine that the first payment task is completed, if the audio input in the microphone is a predetermined audio, and a variation of an amount of the light output from the code scanner is equal to or more than a predetermined amount.

6. The mobile terminal of claim 1, wherein the sensor includes at least one of a front camera installed on a front surface of the mobile terminal, an illumination sensor for measuring the intensity of the light, and an optical sensor embedded in the display.

7. The mobile terminal of claim 6, wherein the controller is further configured to determine that the code scanning situation is sensed, if the intensity of the light measured via the illumination sensor is equal to or more than a predetermined intensity, or the shape of the light received via the front camera is a predetermined shape.

8. The mobile terminal of claim 2, wherein one of the first and second payment tasks is one of tasks for payment for goods, discount benefits, or collection of loyalty points.

9. The mobile terminal of claim 1, wherein the orientation of the displayed first code image is a diagonal direction on the display.

10. The mobile terminal of claim 1, wherein the orientation of the displayed first code image is a lengthwise direction on the display.

11. The mobile terminal of claim 1, wherein the controller is further configured to determine that the first payment task is completed, if a location of the shape of light moves from a display region displaying the first code image to another display region of the display.

12. The mobile terminal of claim 1, wherein the controller is configured to automatically display a second code image for performing a second payment task associated with the first payment task, if the first payment task is completed via recognition of the first code image.

13. The mobile terminal of claim 12, wherein the first code image is a barcode image and the second code image is a payment card image.

14. The mobile terminal of claim 13, wherein the controller is further configured to perform the first payment task and the second payment task in an order set by a user setting.

15. The mobile terminal of claim 1, wherein the controller is further configured to generate the first code image by integrating a plurality of code images into an integrated code image.

16. The mobile terminal of claim 15, wherein the integrated code image includes information for a loyalty task and a payment task.

17. The mobile terminal of claim 16, wherein the controller is further configured to display a first icon and a second icon on the integrated code image where the first icon represents the loyalty task and the second icon represents the payment task.

18. The mobile terminal of claim 17, wherein the controller is further configured to highlight the first icon when the loyalty task is being executed and highlight the second icon when the payment task is being executed.

19. The mobile terminal of claim 1, wherein the controller is further configured to sense that the light emitted by the code scanner is in an upper side of the mobile terminal, and display the first code image by moving a location of the first code image to the upper side of the mobile terminal.

* * * * *